United States Patent
Ku et al.

(10) Patent No.: US 11,915,510 B2
(45) Date of Patent: Feb. 27, 2024

(54) FINGERPRINT SENSOR AND A DISPLAY DEVICE INCLUDING THE SAME

(71) Applicant: SAMSUNG DISPLAY CO., LTD., Yongin-si (KR)

(72) Inventors: Kyo Won Ku, Seoul (KR); Young Sik Kim, Yongin-si (KR); Jung Hak Kim, Hwaseong-si (KR); Jeong Heon Lee, Yongin-si (KR); Hee Yeon Choi, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/391,250

(22) Filed: Aug. 2, 2021

(65) Prior Publication Data

US 2023/0267759 A1  Aug. 24, 2023

(30) Foreign Application Priority Data

Aug. 3, 2020  (KR) .................. 10-2020-0096582

(51) Int. Cl.
  *G06V 40/13* (2022.01)
  *G06F 21/32* (2013.01)
  *H01L 27/146* (2006.01)
  *G06F 21/84* (2013.01)

(52) U.S. Cl.
  CPC .......... *G06V 40/1318* (2022.01); *G06F 21/32* (2013.01); *H01L 27/14623* (2013.01); *G06F 21/84* (2013.01)

(58) Field of Classification Search
  CPC .................................................. G06V 40/13
  See application file for complete search history.

(56) References Cited

U.S. PATENT DOCUMENTS

| | | | |
|---|---|---|---|
| 2015/0369661 A1* | 12/2015 | Lin .................... | G06V 40/1318 250/227.11 |
| 2017/0364763 A1* | 12/2017 | Jin .......................... | G06F 21/32 |
| 2019/0227603 A1* | 7/2019 | Noh ...................... | H04R 1/2811 |
| 2021/0319197 A1* | 10/2021 | Chang .................. | G09G 3/3233 |
| 2021/0319207 A1* | 10/2021 | Zhong ................. | G06V 40/1365 |
| 2021/0320137 A1 | 10/2021 | Kim et al. | |
| 2022/0019755 A1* | 1/2022 | Niu ....................... | G06V 10/147 |

(Continued)

FOREIGN PATENT DOCUMENTS

| | | |
|---|---|---|
| CN | 110945524 | 3/2020 |
| JP | 2010-141358 | 6/2010 |
| KR | 10-2016-0048646 | 5/2016 |

(Continued)

OTHER PUBLICATIONS

Extended European Search Report issued in corresponding European Patent Application No. 21189334.2 dated Dec. 21, 2021.

*Primary Examiner* — Joseph R Haley
(74) *Attorney, Agent, or Firm* — F. Chau & Associates, LLC

(57) ABSTRACT

A fingerprint sensor including: a substrate; a light sensing element that includes a sensing electrode disposed on the substrate, a semiconductor layer disposed on the sensing electrode, and a common electrode disposed on the semiconductor layer; a light-blocking conductive layer disposed on the common electrode and including light transmitting holes; and a light guide unit disposed on the light-blocking conductive layer.

21 Claims, 22 Drawing Sheets

(56) References Cited

U.S. PATENT DOCUMENTS

2023/0110093 A1\*  4/2023  Matsumura ....... H01L 27/14678
257/292

FOREIGN PATENT DOCUMENTS

| KR | 10-2017-0004064 | 1/2017 |
| KR | 10-2019-0008066 | 1/2019 |
| WO | 2021-077259 | 4/2021 |

\* cited by examiner

FINGERPRINT SENSOR AND A DISPLAY DEVICE INCLUDING THE SAME

CROSS-REFERENCE TO RELATED APPLICATION

This application claims priority under 35 § 119 to Korean Patent Application No. 10-2020-0096582, filed on Aug. 3, 2020, the disclosure of which is incorporated by reference herein in its entirety.

TECHNICAL FIELD

The present inventive concept relates to a fingerprint sensor and a display device including the same.

DISCUSSION OF THE RELATED ART

Display devices are output devices for presentation of information in visual form. Display devices are applied to various electronic devices such as smartphones, tablets, notebook computers, monitors, and televisions. The rapid development of mobile communication technology has greatly increased the use of portable electronic devices such as smartphones, tablets, and notebook computers. A portable electronic device may store privacy information, in other words, the portable electronic device may store sensitive information. To protect the privacy information of a user stored on the portable electronic device, biometric authentication may be employed. For example, a display device may include a fingerprint sensor to authenticate a fingerprint of the user before giving the user access to the portable electronic device.

A fingerprint sensor may be an optical, ultrasonic, or capacitive fingerprint sensor. An optical fingerprint sensor may include a light sensing element for sensing light and an optical layer for providing light to the light sensing element with reduced noise in the light. To prevent the optical fingerprint sensor from interfering with other components such as a battery of a display device, a thickness of the optical layer may be reduced.

When the thickness of the optical layer is reduced, a distance between signal lines of a display panel and signal lines of a light sensing layer of the fingerprint sensor may also be reduced. Therefore, signals of the signal lines of the display panel may interfere with signals of the signal lines of the light sensing layer. For example, scan signals of scan lines of the display panel may be coupled to sensing signals of sensing lines of the light sensing layer. In this case, noise in the scan signals of the display panel may be reflected in the sensing signals of the sensing lines of the light sensing layer.

SUMMARY

According to an embodiment of the present inventive concept, there is provided a fingerprint sensor including: a substrate; a light sensing element that includes a sensing electrode disposed on the substrate, a semiconductor layer disposed on the sensing electrode, and a common electrode disposed on the semiconductor layer; a light-blocking conductive layer disposed on the common electrode and including light transmitting holes; and a light guide unit disposed on the light-blocking conductive layer.

According to an embodiment of the present inventive concept, there is provided a display device including: a display panel which displays an image; and a fingerprint sensor which is disposed on a surface of the display panel and senses light passing through the display panel, wherein the fingerprint sensor includes: a substrate; a light sensing element that includes a sensing electrode disposed on the substrate and a common electrode disposed on the sensing electrode; a light-blocking conductive layer that includes light transmitting holes and is disposed on the common electrode, and a light guide portion that guides light to the light sensing element and is disposed on the light-blocking conductive layer.

According to an embodiment of the present inventive concept, there is provided a fingerprint sensor including: a substrate; a light sensing element that includes a sensing electrode disposed on the substrate and a common electrode disposed on the sensing electrode; a light-blocking conductive layer that includes light transmitting holes and is disposed on the common electrode; and a light guide portion that guides light and is disposed on the light-blocking conductive layer, wherein the light guided by the light guide portion is incident on the light sensing element through at least one of the light transmitting holes.

According to an embodiment of the present inventive concept, there is provided a fingerprint sensor including: a substrate; a sensing electrode disposed on the substrate and connected to a transistor; a common electrode disposed on the sensing electrode; a light-blocking conductive layer disposed on the common electrode; and a light guiding unit disposed on the light-blocking conductive layer.

BRIEF DESCRIPTION OF THE DRAWINGS

The above and other features of the present inventive concept will become more apparent by describing in detail embodiments thereof with reference to the accompanying drawings, in which:

FIG. 5 illustrates an example of a display panel, a cover window, a fingerprint sensor and a finger of a user;

DETAILED DESCRIPTION OF THE EMBODIMENTS

Figure 1:
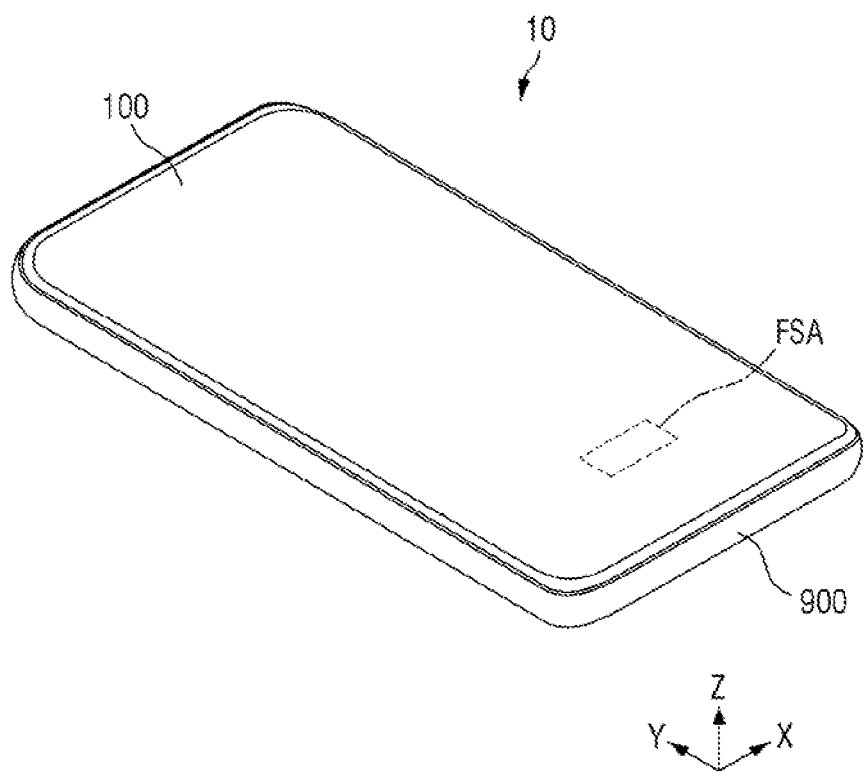
FIG. 1 is a perspective view of a display device according to an embodiment a the present inventive concept.

Embodiments of the present inventive concept will be described more fully hereinafter with reference to the accompanying drawings. Like reference numerals may refer to like elements throughout the specification and the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components maybe present. It will also be understood that when a component is referred to as being "between" two components, it can be the only component between the two components, or one or more intervening components may also be present, it will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Thus, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below.

Figure 2:
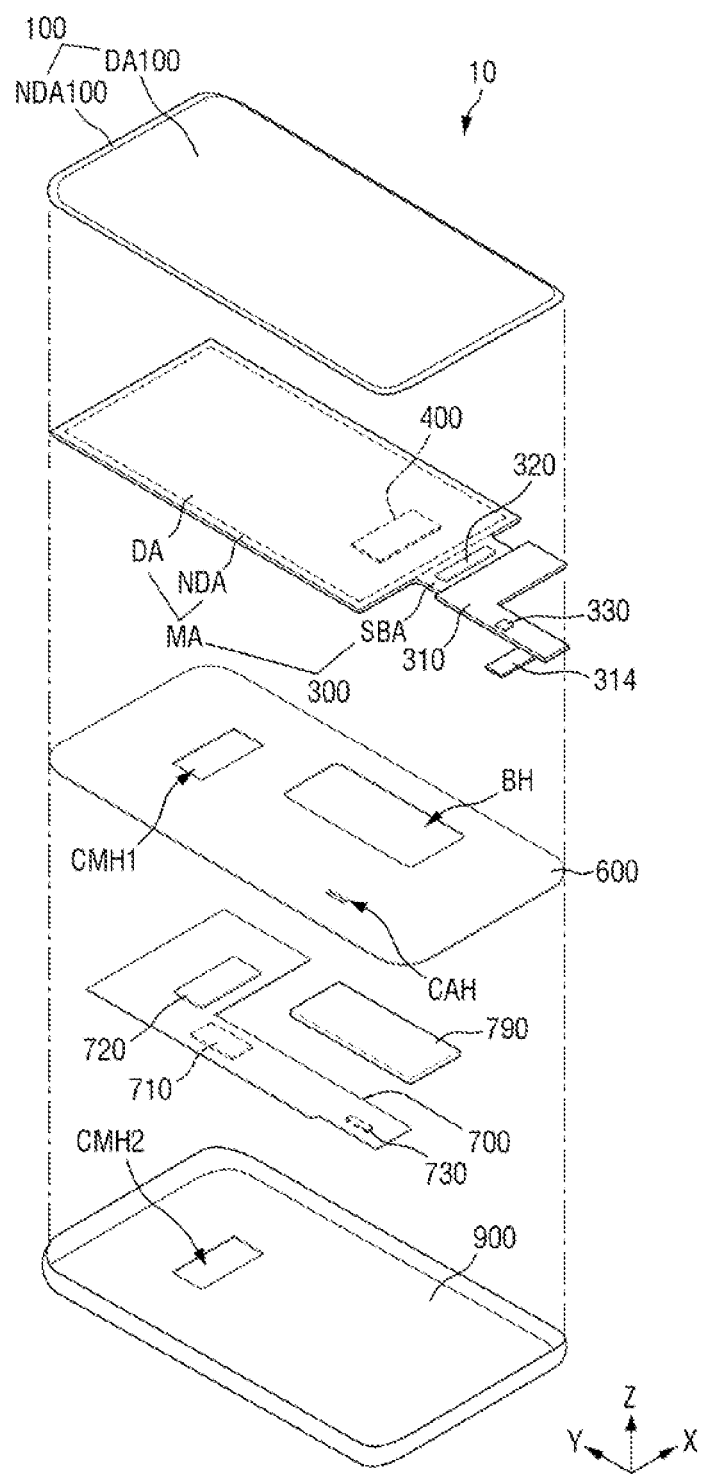
FIG. 2 is an exploded perspective view of the display device according to the embodiment of FIG. 1.

FIG. 1 is a perspective view of a display device 10 according to an embodiment of the present inventive concept. FIG. 2 is an exploded perspective view of the display device 10 according to the embodiment shown in FIG. 1.

Referring to FIGS. 1 and 2, the display device 10 according to the present embodiment may be applied to portable electronic devices such as mobile phones, smartphones, tablet personal computers (PCs), mobile communication terminals, electronic notebooks, electronic books, portable multimedia players (PMPs), navigation devices, and ultra-mobile PCs (UMPCs). Alternatively, the display device 10 according to the present embodiment may be applied as a display unit of a television, a notebook computer, a monitor, a billboard, or the Internet of things (IoT). Alternatively, the display device 10 according to the present embodiment may be applied to wearable devices such as smart, watches, watch phones, glass-like displays, and head-mounted displays (HMDs). Alternatively, the display device 10 according to the present embodiment may be applied to a dashboard of a vehicle, a center fascia of a vehicle, a center information display (CID) disposed on a dashboard of a vehicle, a room mirror display in place of a side mirror of a vehicle, or a display disposed on the back of a front seat as an entertainment for rear-seat passengers of a vehicle.

In the present specification, a first direction (e.g., X-axis direction) may be a short side direction of the display device 10, for example, a horizontal direction of the display device 10. A second direction (e.g., Y-axis direction) may be a long side direction of the display device 10, for example a vertical direction of the display device 10. A third direction (e.g., Z-axis direction) may be a thickness direction of the display device 10.

The display device 10 may have a planar shape similar to a quadrangle. For example, the display device 10 may have a planar shape similar to a quadrangle having short sides in the first direction (X-axis direction) and long sides in the second direction (Y-axis direction) as illustrated in FIG. 1. Each corner where a short side extending in the first direction (X-axis direction) meets a long side extending in the second direction (Y-axis direction) may be rounded with a predetermined curvature or may be right-angled. The planar shape of the display device 10 is not limited to the quadrangular shape but may also be another polygonal shape, a circular shape, or an oval shape.

The display device 10 may be flat. Alternatively, the display device 10 may be formed such that two facing sides are bent. For example, the display device 10 may be formed such that its left and right sides are bent. Alternatively, the display device 10 may be formed such that all of the upper, lower, left and right sides are bent.

The display device 10 according to the present embodiment includes a cover window 100, a display panel 300, a display circuit board 310, a display driving circuit 320, a fingerprint sensor 400, a bracket 600, a main circuit board 700, and a bottom cover 900.

The cover window 100 may be disposed on the display panel 300 to cover a front surface of the display panel 300. Thus, the cover window 100 may protect the front surface of the display panel 300.

The cover window 100 may include a light transmitting area DA100 corresponding to the display panel 300 and a light blocking area NDA100 corresponding to an area other than the display panel 300. The light blocking area NDA100 may be opaque. Alternatively, the light blocking area NDA100 may be a decorative layer having a pattern that may be shown to a user when an image is not displayed.

The display panel 300 may be disposed under the cover window 100. The display panel 300 may be a light emitting display panel including light emitting elements. For example, the display panel 300 may be an organic light emitting display panel using organic light emitting diodes that include organic light emitting layers, a micro light emitting diode display panel using micro light emitting diodes, a quantum dot light emitting display panel using quantum dot light emitting diodes that include quantum dot light emitting layers, or an inorganic light emitting display panel using inorganic light emitting elements that include inorganic semiconductors. A case where the display panel 300 is an organic light emitting display panel will be mainly described below.

The display panel 300 may include a main area MA and a sub area SBA.

The main area MA may include a display area DA for displaying an image and a non-display area NDA located around the display area DA. The display area DA may include display pixels SP (see FIG. 5) that display an image. The non-display area NDA may be an area extending from the outside of the display area DA to edges of the display panel 300.

The display area DA may include a fingerprint sensing area FSA. The fingerprint sensing area FSA indicates an area where the fingerprint sensor 400 is disposed. The fingerprint sensing area FSA may be a portion of the display area NDA as illustrated in FIG. 2, but the present inventive concept is not limited thereto. The fingerprint sensing area FSA may also be the entire display area DA and substantially the same size as the display area DA.

The sub area SBA may protrude from a side of the main area MA in the second direction (Y-axis direction). A length of the sub area SBA in the first direction (X-axis direction) may be smaller than a length of the main area MA in the first direction (X-axis direction), and a length of the sub area SBA in the second direction (Y-axis direction) may be smaller than a length of the main area MA in the second direction (Y-axis direction), but the present inventive concept is not limited thereto. For example, a length of the sub area SBA in the first direction (X-axis direction) may be equal to a length of the main area MA in the first direction (X-axis direction).

Although the sub area SBA is unfolded in FIG. 2, it may also be bent, in which case the sub area SBA may be disposed on a lower surface of the display panel 300. When the sub area. SBA is bent, it may be overlapped by the main area MA in the thickness direction (Z-axis direction). The display circuit board 310 and the display driving circuit 320 may be disposed on the sub area SBA.

The display circuit board 310 may be attached to an end of the sub area SBA of the display panel 300 using a conductive adhesive member such as an anisotropic conductive film, Therefore, the display circuit board 310 may be electrically connected to the display panel 300 and the display driving circuit 320. The display panel 300 and the display driving circuit 320 may receive digital video data, timing signals, and driving voltages through the display circuit board 310. The display circuit hoard 310 may be a flexible printed circuit board, a primed circuit board, or a flexible film such as a chip-on-film.

The display driving circuit 320 may generate signals and voltages for driving the display panel 300. The display driving circuit 320 may be an integrated circuit and attached onto the sub area SBA of the display panel 300 using a chip-on-glass (COG) method, a chip-on-plastic (COP) method, or an ultrasonic bonding method. However, the present inventive concept is not limited thereto. For example, the display driving circuit 320 may also be attached onto the display circuit board 310 using a chip-on-film (COF) method.

A touch driving circuit 330 may be disposed on the display circuit board 310. Each of the touch driving circuit 330 and a pressure driving circuit may be formed as an integrated circuit and attached to an upper surface of the display circuit board 310. Alternatively, the touch driving circuit 330 and the pressure driving circuit may be integrated into one integrated circuit.

The touch driving circuit 330 may be electrically connected to touch electrodes of a touch electrode layer of the display panel 300 through the display circuit board 310. The display panel 300 may include the touch electrode layer having the touch electrodes for sensing an object such as a human finger or a pen. The touch driving circuit 330 may output a touch driving signal to the touch electrodes and sense a voltage charged in capacitance of the touch electrodes.

The touch driving circuit 330 may generate touch data according to a change in an electrical signal sensed at each of the touch electrodes and transmit the touch data to a main processor 710, and the main processor 710 may analyze the touch data to calculate touch coordinates at which a touch has occurred. The touch may include a contact touch and a proximity touch. The contact touch refers to a case where an object such as a human finger or a pen directly contacts the cover window 100 disposed on the touch electrode layer. The proximity touch refers to a case where an object such as a human finger or a pen is positioned (e.g., hovers) above the cover window 100 in proximity to the cover window 100.

A power supply unit for supplying display driving voltages for driving the display driving circuit 320 may be additionally, disposed on the display circuit board 310.

The fingerprint sensor 400 may be disposed on the lower surface of the display panel 300. The fingerprint sensor 400 may be attached to the lower surface of the display panel 300 using a transparent adhesive member. For example, the transparent adhesive member may be a transparent adhesive film such as an optically clear adhesive (OCA) film or a transparent adhesive resin such as an optically clear resin (OCR).

The bracket 600 may be disposed under the display panel 300. The bracket 600 may include plastic, metal, or both plastic and metal. The bracket 600 may include a first camera hole CMH1 into which a first camera sensor 720 is inserted, a battery hole BH in which a battery 790 is disposed, and a cable hole CAH through which a cable 314 connected to the display circuit board 310 passes.

The main circuit board 700 may be disposed under the bracket 600. The main circuit board 700 may be a printed circuit board or a flexible printed circuit board.

The main circuit board 700 may include the main processor 710, the first camera sensor 720, and a main connector 730. The first camera sensor 720 may be disposed on both upper and lower surfaces of the main circuit board 700, the main processor 710 may be disposed on the upper surface of the main circuit board 700, and the main connector 730 may be disposed on the lower surface of the main circuit board 700.

The main processor 710 may control all functions of the display device 10. For example, the main processor 70 may output digital video data to the display driving circuit 320 through the display circuit board 310 so that the display panel 300 can display an image. In addition, the main processor 710 may receive touch data from the touch driving circuit 330, determine touch coordinates of a user, and then execute an application indicated by an icon displayed at the touch coordinates of the user. In addition, the main processor 710 may convert first image data received from the first camera sensor 720 into digital video data and output the digital video data to the display driving circuit 320 through the display circuit board 310. Thus, an image captured by the first camera sensor 720 can be displayed on the display panel 300.

The first camera sensor 720 processes an image frame such as a still image or a moving image obtained by an image sensor and outputs the processed image frame to the main processor 710. The first camera sensor 720 may be a complementary metal-oxide-semiconductor (CMOS) image sensor or a charge-coupled device (CCD) sensor. The first camera sensor 720 may be exposed on a lower surface of the bottom cover 900 by a second camera hole CMH2. Thus, the first camera sensor 720 can photograph an object or background disposed under the display device 10.

The cable 314 passing through the cable hole CAH of the bracket 600 may be connected to the main connector 730. Therefore, the main circuit board 700 may be electrically connected to the display circuit board 310.

The battery 790 may be disposed not to overlap the main circuit board 700 in the third direction (Z-axis direction). The battery 790 may overlap the battery hole BH of the bracket 600. The battery 790 may be disposed in the battery hole BH of the bracket 600. In addition, the fingerprint sensor 400 may overlap the battery hole BH of the bracket 600. The fingerprint sensor 400 may overlap the battery 790 or not overlap the battery 790 in the battery hole BH of the bracket 600. The fingerprint sensor 400 and the battery 790 disposed in the battery hole BH of the bracket 600 will be described later in conjunction with FIGS. 3 and 4.

In addition, the main circuit board 700 may further include a mobile communication module capable of transmitting and receiving wireless signals to and from at least one of a base station, an external terminal, and a server over a mobile communication network. The wireless signals may include voice signals, video call signals, or various types of data according to transmission/reception of text/multimedia messages.

The bottom cover 900 may be disposed under the main circuit board 700 and the battery 790. The bottom cover 900 may be fastened and fixed to the bracket 600. The bottom cover 900 may form the bottom exterior of the display device 10. The bottom cover 900 may include plastic, metal, or both plastic and metal.

The second camera hole CMH2 exposing a lower surface of the first camera sensor 720 may be formed in the bottom cover 900. The position of the first camera sensor 720 and the positions of the first and second camera holes CMH1 and CMH2 corresponding to the first camera sensor 720 are not limited to the embodiment illustrated in FIG. 2.

Figure 3:
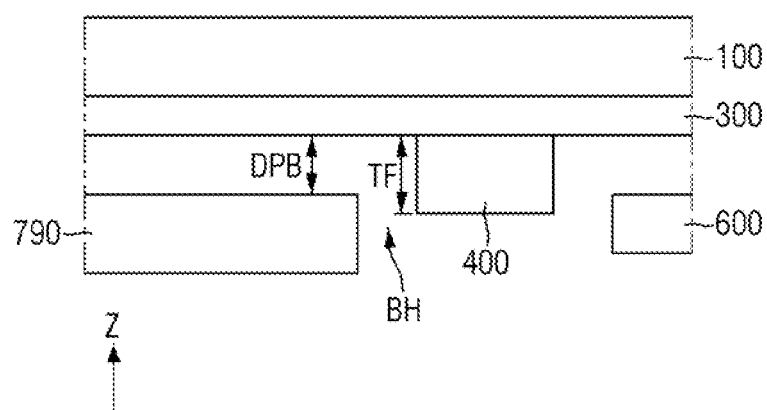
FIG. 3 is a cross-sectional view illustrating an example of a cover window, a display panel, a fingerprint sensor, a bracket, and a battery of FIG. 2.
Figure 4:
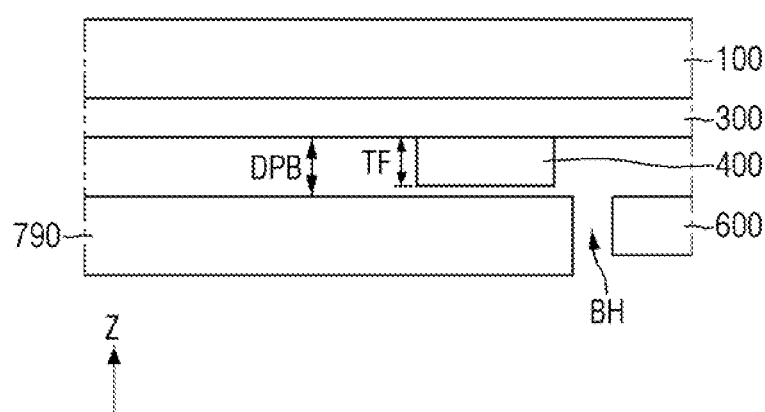
FIG. 4 is a cross-sectional view illustrating an example of the cover window, the display panel, the fingerprint sensor, the bracket, and the battery of FIG. 2.

FIG. 3 is a cross-sectional view illustrating an example of the cover window 100, the display panel 300, the fingerprint sensor 400, the bracket 600, and the battery 790 of FIG. 2. FIG. 4 is a cross-sectional view illustrating an example of the cover window 100, the display panel 300 the fingerprint sensor 400, the bracket 600, and the battery 790 of FIG. 2.

Referring to FIGS. 3 and 4, the display panel 300 may be disposed on a lower surface of the cover window 100, and the fingerprint sensor 400 may be disposed on the lower surface of the display panel 300. The battery 790 may be disposed on the lower surface of the display panel 300. The fingerprint sensor 400 and the battery 790 may be disposed in the battery hole BH of the bracket 600.

As illustrated in FIG. 3, a thickness TF of the fingerprint sensor 400 may be greater than a distance DPB between the display panel 300 and the battery 790. In addition, the thickness TT of the fingerprint sensor 400 may be greater than a distance between the display panel 300 and the bracket 600. The distance DPB between the display panel 300 and the battery 790 may be a minimum distance between the display panel 300 and the battery 790 in the third direction (Z-axis direction). When the battery 790 and the fingerprint sensor 400 overlap in the third direction (Z-axis direction) in the battery hole BH, the battery 790 may interfere with the fingerprint sensor 400. Therefore, the battery 790 may be disposed not to overlap the fingerprint sensor 400 in the third direction (Z-axis direction). In other words, when the battery 790 is placed in the battery hole BH, there may be a restriction on a space in which the battery 790 is disposed.

As illustrated in FIG. 4, the thickness TF of the fingerprint sensor 400 may be smaller than the distance DPB between the display panel 300 and the battery 790. In this case, even if the battery 790 and the fingerprint sensor 400 overlap in the third direction (Z-axis direction) in the battery BH, the battery 790 does not interfere with the fingerprint sensor 400. This is so, for example, because a gap may exist between the fingerprint sensor 400 and the battery 790, Therefore, when the battery 790 is placed in the battery hole BH, there may be no restriction on the space in which the battery 790 is disposed.

Figure 5:
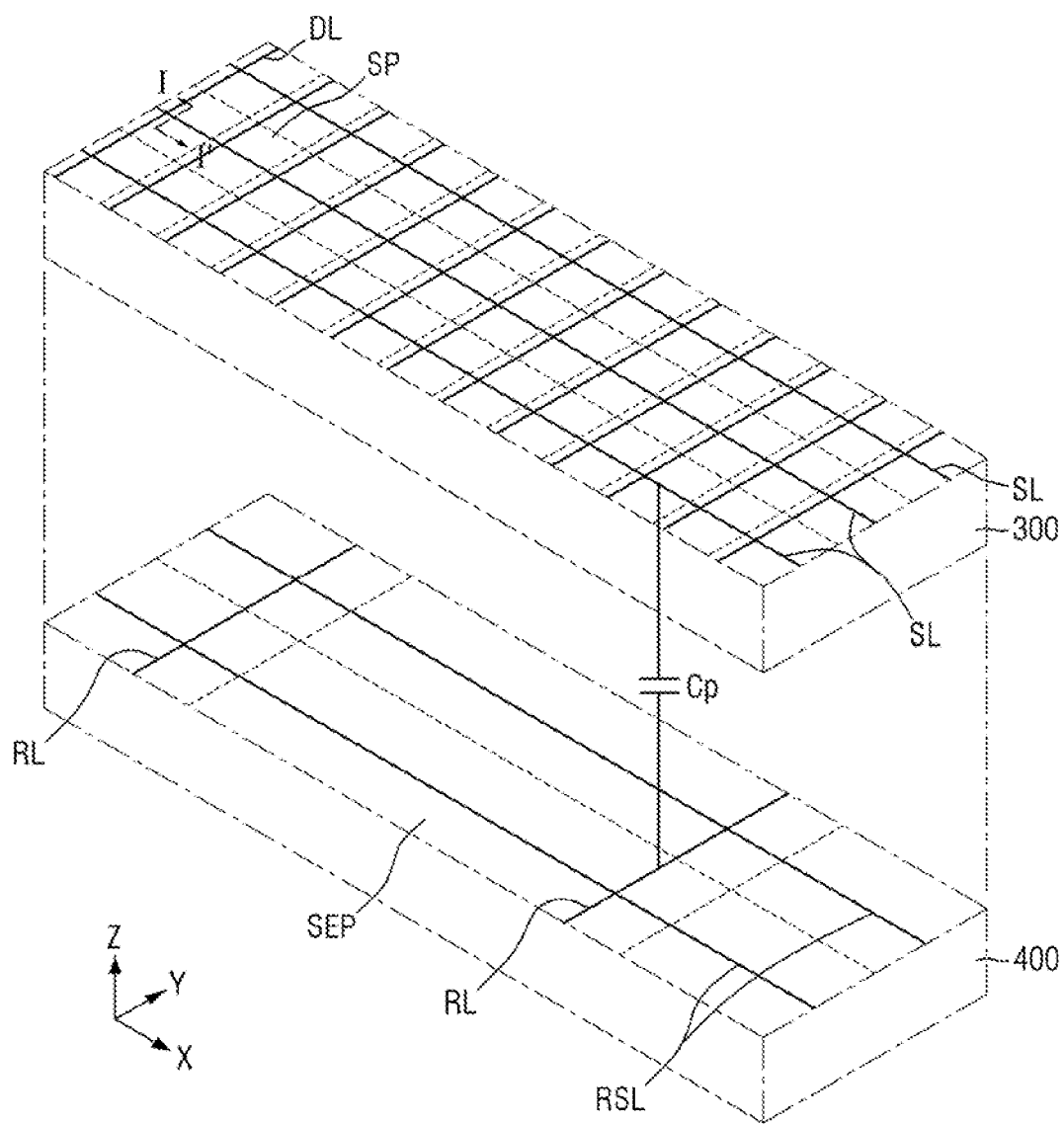
FIG. 5 illustrates an example of scan lines and data lines of the display panel of FIG. 4 and fingerprint scan lines and sensing lines of the fingerprint sensor of FIG. 4.

FIG. 5 illustrates an example of scan lines SP and data lines DL of the display panel 300 of FIG. 4 and fingerprint scan lines RSL and sensing lines RL of the fingerprint sensor 400 of FIG. 4.

For ease of description, only the display pixels SP, the scan lines SL and the data lines DL of the display panel 300 and sensor pixels SEP, the fingerprint scan lines RSL and the sensing lines RL of the fingerprint sensor 400 are illustrated in FIG. 5.

Referring to FIG. 5, the display pixels SP may be arranged in a matrix form in the first direction (X-axis direction) and the second direction (Y-axis direction) intersecting each other. However, the arrangement of the display pixels SP is not limited thereto and may vary according to the size and shape of the display panel 300.

The scan lines SL may extend in the first direction (X-axis direction) and may be arranged in the second direction (Y-axis direction), The data lines DL may extend in the second direction (Y-axis direction) and may be arranged in the first direction (X-axis direction). Each of the display pixels SF may overlap at least one scan line SL and at least one data line DL. Each of the display pixels SF may be connected to at least one scan line SL and at least one data line DL. Therefore, when a scan signal is transmitted to the scan line SL, each of the display pixels SP connected to the scan line SL may receive a data voltage of the data line DL connected thereto. Each of these display pixels SP may emit light according to a driving current flowing according to the data voltage.

The sensor pixels SEP of the fingerprint sensor 400 may be arranged in a matrix form in the first direction (X-axis direction) and the second direction (Y-axis direction) intersecting each other. However, the arrangement of the sensor pixels SEP is not limited thereto and may vary according to the size and shape of the fingerprint sensor 400.

The fingerprint scan lines RSL may extend in the first direction (X-axis direction) and may be arranged in the second direction (Y-axis direction). The sensing lines RL may extend in the second direction (Y-axis direction) and may be arranged in the first direction (X-axis direction). Each of the sensor pixels SEP may overlap at least one fingerprint scan line RSL and at least one sensing line RL. Each of the sensor pixels SEP may be connected to at least one fingerprint scan line RSL and at least one sensing line RL.

When the thickness TF of the fingerprint sensor 400 is smaller than the distance DPB between the display panel 300 and the battery 790, a distance between the scan lines SE of the display panel 300 and the sensing lines RL of the fingerprint sensor 400 may be small. Therefore, a parasitic capacitance Cp may exist between the scan lines SL of the display panel 300 and the sensing lines RL of the fingerprint sensor 400. Since scan signals of the scan lines SL of the display panel 300 have a large swing width, they may be coupled to sensing signals of the sensing lines RE of the fingerprint sensor 400 by the parasitic capacitance Cp. In other words, noise due to the scan signals of the scan lines SE of the display panel 300 may be reflected in the sensing signals of the sensing lines RL of the fingerprint sensor 400 by the parasitic capacitance Cp.

Alternatively, since fingerprint scan signals of the fingerprint scan lines RSL of the fingerprint sensor 400 have a large swing width, they may be coupled to the sensing signals of the scan lines SL or the data signals of the data lines DL of the display panel 300 by the parasitic capacitance Cp. In other words, noise due to the fingerprint scan signals of the fingerprint scan lines RSL of the fingerprint sensor 400 may be reflected in the scan signals of the scan lines SL or data voltages of the data lines DL of the display panel 300 by the parasitic capacitance Cp.

Therefore, if the scan signals of the scan lines SL of the display panel 300 and the sensing signals of the sensing lines RL of the fingerprint sensor 400 can be prevented from affecting each other due to the parasitic capacitance Cp, noise reflection can be reduced.

Figure 6:
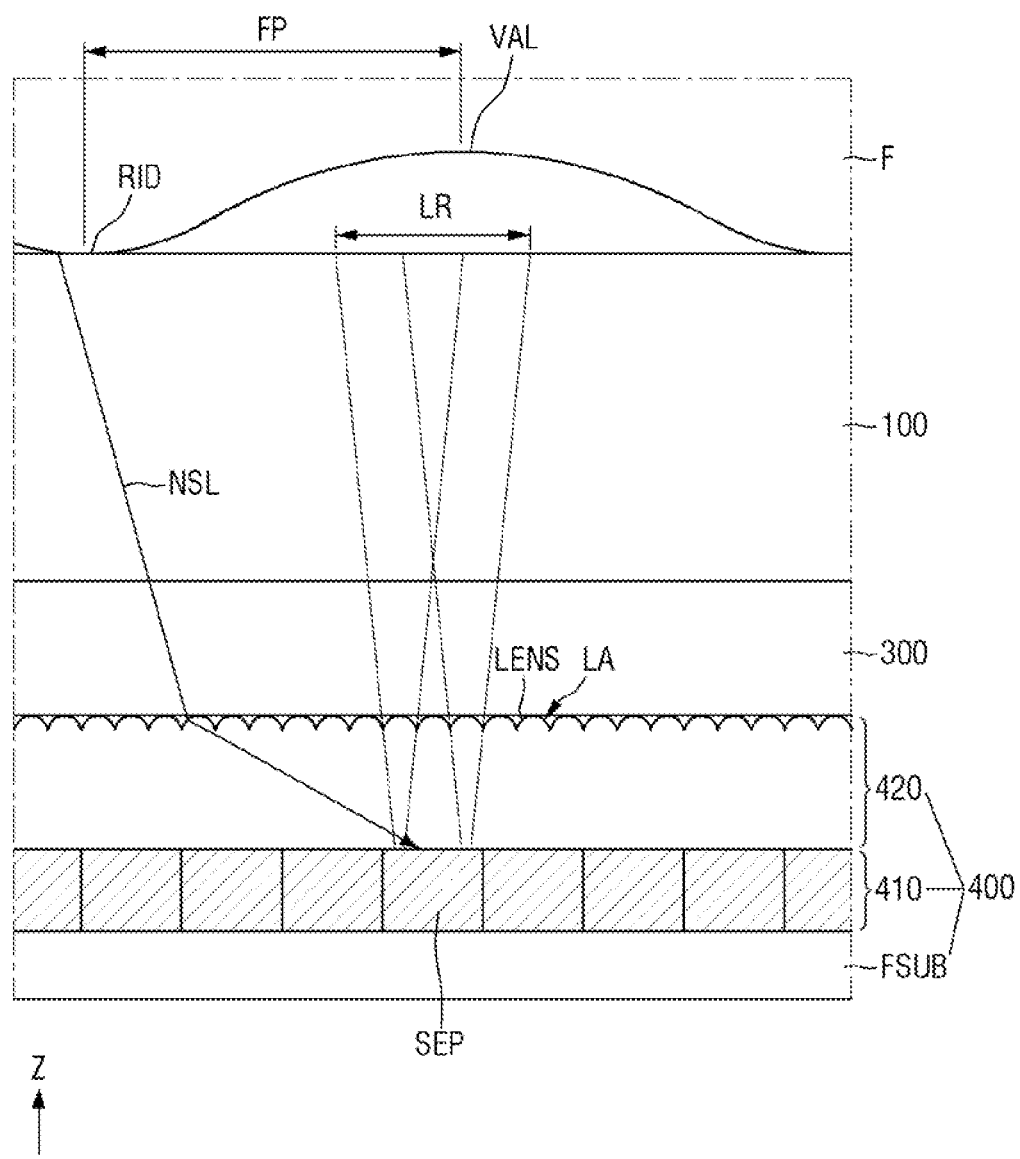

FIG. 6 illustrates an example of the display panel, the cover window, the fingerprint sensor and a finger of a user.

In FIG. 6, a case where a user touches the cover window 100 of the display device 10 with his or her finger F for fingerprint recognition is illustrated.

Referring to FIG. 6, the display device 10 further includes the cover window 100 disposed on an upper surface of the display panel 300. The cover window 100 may be disposed on the display panel 300 to cover the upper surface of the display panel 300. The cover window 100 may protect the upper surface of the display panel 300. The cover window 100 may be attached to the upper surface of the display panel 300 using a transparent adhesive member.

The cover window 100 may be made of a transparent material and may be glass or plastic. For example, when the cover window 100 is glass, it may be ultra-thin glass (UTG) having a thickness of 0.1 mm or less. When the cover window 100 is plastic, it may include a transparent polyimide film.

The fingerprint sensor 400 may be disposed on the lower surface of the display panel 300. The fingerprint sensor 400 may be attached to the lower surface of the display panel 300 using a transparent adhesive member.

The fingerprint sensor 400 may include a light sensing layer 410 including the sensor pixels SEP and a light guide unit 420 disposed on the light sensing layer 410 and designed to provide or guide light to each of the sensor pixels SEP of the light sensing layer 410. In the embodiment of FIG. 6, the light guide unit 420 includes a lens array LA having a plurality of lenses LENS.

Each of the sensor pixels SEP may be overlapped by at least one lens LENS of the lens array LA in the third direction (Z-axis direction) which is the thickness direction of the display panel 300 or a fingerprint sensor substrate FSUB. Although each of the sensor pixels SEP is overlapped by three lenses LENS in the third direction (Z-axis direction) in FIG. 6, the number of lenses LENS overlapping each of the sensor pixels SEP in the third direction (Z-axis direction) is not limited thereto. For example, each sensor pixel SEP may be overlapped by less than or more than three lenses LENS. Each of the lenses LENS may be shaped like a convex lens that is convex upward. In other words, each of the lenses LENS may be convex toward the display panel 300.

Light reflected by a fingerprint of the finger F may be concentrated on the sensor pixels SEP by the lenses LENS of the light guide unit 420. When the user's finger F touches the cover window 100, light output from the display panel 300 may be reflected by a ridge RID and a valley VAL of the fingerprint of the finger F. Here, the amount of light reflected by the ridge RID of the fingerprint of the finger F may be different from the amount of light reflected by the valley VAL of the fingerprint of the finger F.

A range LR of light incident on each sensor pixel SEP through the lenses LENS of the light guide unit 420 may be smaller than a distance FP between the ridge RID and the valley VAL of the fingerprint of the finger F. Since the amount of light reflected by the ridge RID of the fingerprint of the finger F is different from the amount of light reflected by the valley VAL of the fingerprint of the finger F, a sensing current flowing through a light sensing element of each sensor pixel SEP may vary according to whether incident light is light reflected by the ridge RID of the fingerprint of the finger F or light reflected by the valley VAL of the fingerprint of the finger F. Accordingly, a sensing voltage output from each sensor pixel SEP may vary according to whether the incident light is the light reflected by the ridge RID of the fingerprint of the finger F or the light reflected by the valley VAL of the fingerprint of the finger F. Therefore, a sensor driving circuit 480 (see FIG. 10) may recognize a fingerprint pattern of the finger F according to the sensing, voltages of the sensor pixels SEP.

Figure 7:
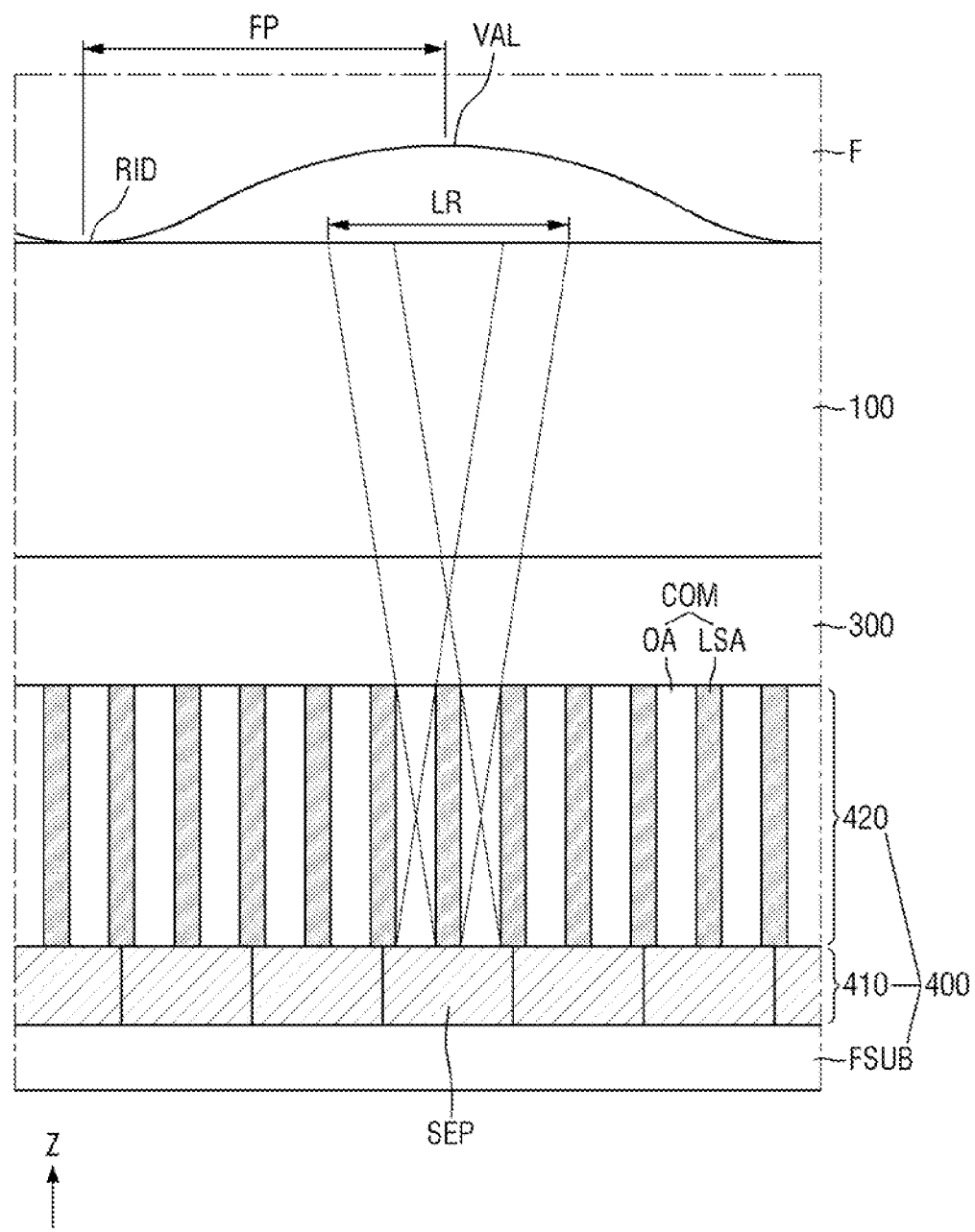
FIG. 7 illustrates an example of a display panel, a cover window, a fingerprint sensor and a finger of a user.

FIG. 7 illustrates an example of the display panel, the cover window, the fingerprint sensor and a finger of a user.

The embodiment of FIG. 7 is different from the embodiment of FIG. 6 in that a light guide unit 420 includes a collimator COM having light transmitting areas OA and a light blocking area LSA, instead of the lens array LA. In FIG. 7, differences from the embodiment of FIG. 6 will be mainly described.

Referring to FIG. 7, the light blocking area LSA may surround each of the light transmitting areas OA. In other words, the light blocking area LSA may be disposed on opposite sides of the light transmitting areas OA. The light blocking area LSA may be disposed between the light transmitting areas OA in one direction. Each sensor pixel SEP may be overlapped by a plurality of light transmitting areas OA in the third direction (Z-axis direction). For example, each sensor pixel SEP may be overlapped by at least two light transmitting areas OA in the third direction (Z-axis direction).

Each of the light transmitting areas OA may be a passage through which light reflected by a ridge RID and a valley VAL of a fingerprint of a finger F passes. Each of the light transmitting areas OA may be made of an organic layer such as acryl resin, epoxy resin, phenolic resin, polyamide resin, or polyimide resin.

The light blocking area LSA may be made of photosensitive resin capable of blocking light. For example, the light blocking area LSA may include an inorganic black pigment such as carbon black or an organic black pigment.

When a user's finger F touches a cover window 100, light output from a display panel 300 may be reflected by the ridge RID and the valley VAL of the fingerprint of the finger F. Here, the amount of light reflected by the ridge RID of the fingerprint of the finger F may be different from the amount of light reflected by the valley VAL of the fingerprint of the finger F.

A range LR of light incident on each sensor pixel SEP through the light transmitting areas OA may be smaller than a distance FP between the ridge RID and the valley VAL of the fingerprint of the finger F. Since the amount of light reflected by the ridge RID of the fingerprint of the finger F is different from the amount of light reflected by the valley VAL of the fingerprint of the finger F, a sensing current flowing through a light sensing element of each sensor pixel SEP may vary according to whether incident light is light reflected by the ridge RID of the fingerprint of the finger F or light reflected by the valley VAL of the fingerprint of the finger F. Accordingly, a sensing voltage output from each sensor pixel SEP may vary according to whether the incident light is the light reflected by the ridge RID of the fingerprint of the finger F or the light reflected by the valley VAL of the fingerprint of the finger F. Therefore, the sensor driving circuit 480 (see FIG. 10) may recognize a fingerprint pattern of the finger F according to the sensing voltages of the sensor pixels SEP.

Figure 8:
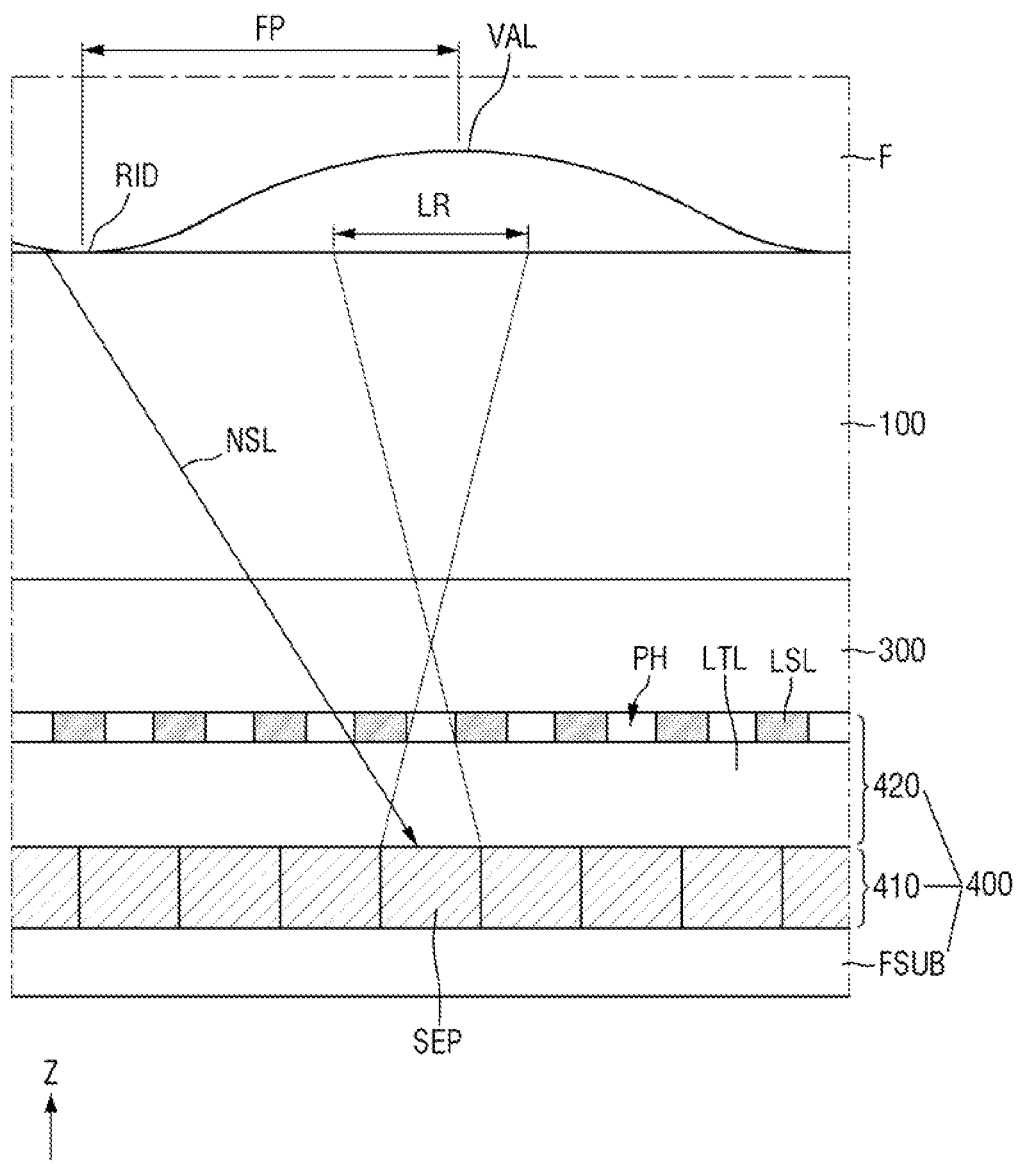
FIG. 8 illustrates an example of a display panel, a cover window, a fingerprint sensor and a finger of a user.

FIG. 8 illustrates an example of the display panel, the cover window, the fingerprint sensor and a finger of a user.

The embodiment of FIG. 8 is different from the embodiment of FIG. 6 in that a light guide unit 420 includes a light blocking layer LSL having pinholes PH and a light transmitting layer LTL, instead of the lens array LA. In FIG. 8, differences from the embodiment of FIG. 6 will be mainly described.

Referring to FIG. 8, the light transmitting layer LTL may be disposed on a light sensing layer 410 of a fingerprint sensor 400. The light transmitting layer LTL may be made of an insulating material that transmits light. For example, the light transmitting layer LTL may be made of an organic layer such as acryl resin, epoxy resin, phenolic resin, polyamide resin, or polyimide resin.

The light blocking layer LSL may be disposed on the light transmitting layer LTL. The light blocking layer LSL may include photosensitive resin capable of blocking light, for example, an inorganic black pigment such as carbon black or an organic black pigment. Alternatively, the light blocking layer LSL may include a metal material that does not transmit light or has low light transmittance. For example, the light blocking layer LSL may be a single layer or a multilayer made of any one or more of molybdenum (Mo), aluminum (Al), chromium (Cr), gold (Au), titanium (Ti), nickel (Ni), neodymium (Nd), copper (Cu), and alloys of the same.

Each pinhole PH of the light blocking layer LSL may be a passage through which light reflected by a ridge RID and a valley VAL of a fingerprint of a finger F passes. The pinholes PH may overlap sensor pixels SEP in the third direction (Z-axis direction), respectively. Although each of the sensor pixels SEP is overlapped by one pinhole PH in the third direction (Z-axis direction) in FIG. 8, the number of pinholes PH overlapping each of the sensor pixels SEP in the third direction (Z-axis direction) is not limited thereto. For example, at least one of the sensor pixels SEP may be overlapped by at least two of the pinholes PH.

When a user's finger F touches a cover window 100, light output from a display panel 300 may be reflected by the ridge RID and the valley VAL of the fingerprint of the finger F. Here, the amount of light reflected by the ridge RID of the fingerprint of the finger F may be different from the amount of light reflected by the valley VAL of the fingerprint of the finger F.

A range LR of light incident on each sensor pixel SEP through a pinhole PH may be smaller than a distance FP between the ridge RID and the valley VAL of the fingerprint of the finger F. Since the amount of light reflected by the ridge RID of the fingerprint of the finger is different from the amount of light reflected by the valley VAL of the fingerprint of the finger F, a sensing current flowing through a light sensing element of each sensor pixel SEP may vary according to whether incident light is light reflected by the ridge RID of the fingerprint of the finger F or light reflected by the valley VAL of the fingerprint of the finger F. Accordingly, a sensing voltage output from each sensor pixel SEP may vary according, to whether the incident light is the light reflected by the ridge RID of the fingerprint of the finger F or the light reflected by the valley VAL of the fingerprint of the finger F. Therefore, the sensor driving circuit 480 (see FIG. 10) may recognize a fingerprint pattern of the finger F according to the sensing voltages of the sensor pixels SEP.

Although the light guide unit 420 includes one lens array LA, one collimator COM, or one light blocking layer LSL in FIGS. 6 through 8, the present inventive concept is not limited thereto. In other words, the light guide unit 420 may include a combination of any two or three of the lens array LA, the collimator COM, and the light blocking layer LSL. For example, the light guide unit 420 may include the lens array LA and the collimator COM, include the lens array LA and the light blocking layer LSL, include the collimator COM and the light blocking layer LSL, or include the lens array LA, the collimator COM and the light blocking layer LSL.

Hereinafter fingerprint sensors 400 capable of minimizing the amount of noise light (NSL in FIGS. 6 and 8) incident on the sensor pixels SEP while preventing or reducing the scan signals of the scan lines SL of the display panel 300 and the sensing signals of the sensing lines RL of the fingerprint sensors 400 from affecting each other due to the parasitic capacitance Cp will be described in detail in conjunction with FIGS. 9 through 21.

Figure 9:
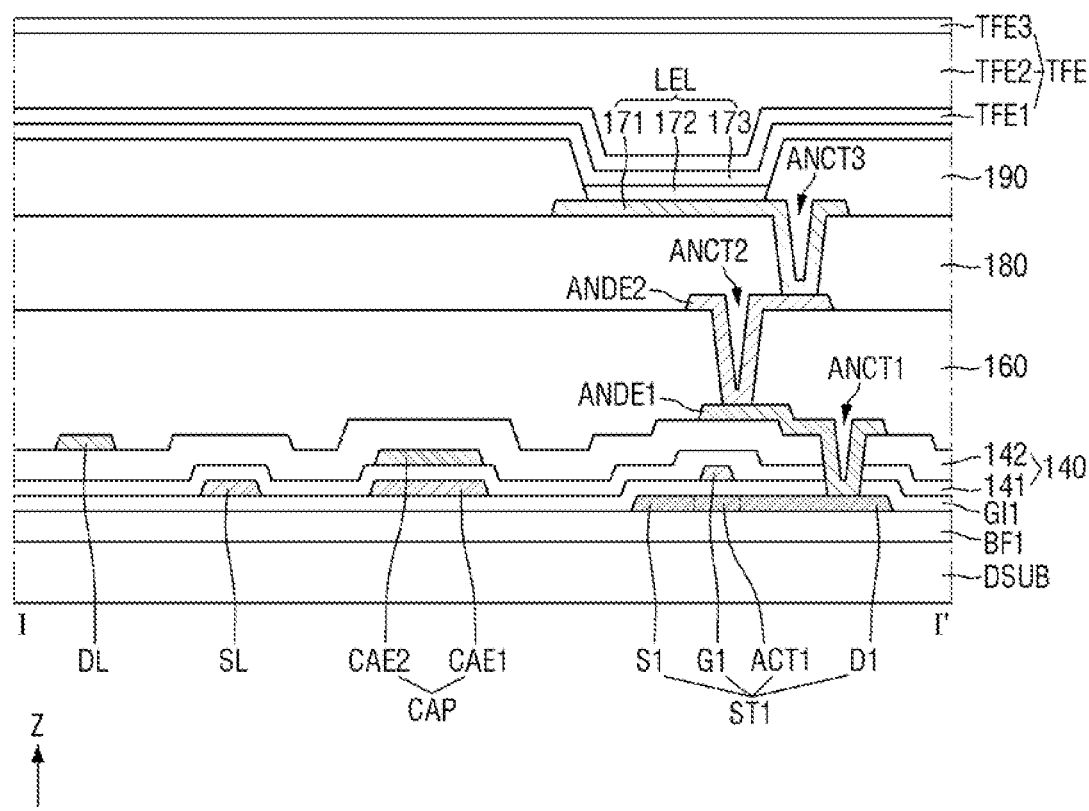
FIG. 9 is a cross-sectional view of an example of the display panel taken along line I-I' of FIG. 5.

FIG. 9 is a cross-sectional view of an example of the display panel 300 taken along line I-I' of FIG. 5.

Referring to FIG. 9, the display panel 300 may include display pixels SP that display an image. Each of the display pixels SP may include a light emitting element LEL, a first thin-film transistor ST1, and a capacitor CAP.

A display substrate DSUB may be made of an insulating material such as glass or polymer resin. For example, the display substrate DSUB may include polyimide. The display substrate DSUB may be a flexible substrate that can be bent, folded, rolled, and the like.

The display substrate DSUB may include, for example, a plurality of organic layers and a plurality of inorganic layers. For example, the display substrate DSUB may include a first organic layer, a first barrier layer disposed on the first organic layer and including at least one inorganic layer, a second organic layer disposed on the first barrier layer, and a second barrier layer disposed on the second organic layer and including at least one inorganic layer.

A first buffer layer BF1 may be disposed on the display substrate DSUB. The first buffer layer BF1 is used to protect a thin-film transistor of a thin-film transistor layer and a light emitting layer 172 of a light emitting element layer from moisture introduced through the display substrate DSUB which is vulnerable to moisture permeation. The first buffer layer BF1 may be composed of a plurality of inorganic layers stacked alternately. For example, the first buffer layer BH may be a multilayer in which one or more inorganic layers selected from a silicon nitride layer, a silicon oxynitride layer, a silicon oxide layer, a titanium oxide layer, and an aluminum oxide layer are alternately stacked.

A first active layer ACT1, a first source electrode S1, and a first drain electrode D1 of the first thin-film transistor ST1 may be disposed on the first buffer layer BF1. The first active layer ACT1 of the first thin-film transistor ST1 includes polycrystalline silicon, monocrystalline silicon, low-temperature polycrystalline silicon, amorphous silicon, or an oxide semiconductor. The first source electrode S1 and the first drain electrode D1 may be formed to have conductivity by doping a silicon semiconductor or an oxide semiconductor with ions or impurities. The first active layer ACT1 may be overlapped by a first gate electrode G1 in the third direction (Z-axis direction) which is the thickness direction of the display substrate DSUB, and the first source electrode S1 and the first drain electrode D1 may not be overlapped by the first gate electrode G1 in the third direction (Z-axis direction).

A first gate insulating layer GI1 may be disposed on the first active layer ACT1 of the first thin-film transistor ST1. The first gate insulating layer GI1 may be made of an inorganic layer such as a silicon nitride layer, a silicon oxynitride layer, a silicon oxide layer, a titanium oxide layer, or an aluminum oxide layer. The first gate insulating layer GI1 may also be disposed on the first source electrode S1 and the first drain electrode D1.

The first gate electrode G1 of the first thin-film transistor ST1 and a first capacitor electrode CAE1 may be disposed on the first gate insulating layer GI1. The first gate electrode G1 may overlap the first active layer ACT1 in the third direction (Z-axis direction). The first capacitor electrode CAE1 may be overlapped by a second capacitor electrode CAE2 in the third direction (Z-axis direction). The first gate electrode G1 may be a single layer or a multilayer made of any one or more of molybdenum (Mo), aluminum (Al), chromium (Cr), gold (Au), titanium (Ti), nickel (Ni), neodymium (Ne), copper (Cu), and alloys of the same.

A first interlayer insulating film 141 may be disposed on the first gate electrode G1 and the first capacitor electrode CAE1. The first interlayer insulating film 141 may be made of an inorganic layer such as a silicon nitride layer, a silicon oxynitride layer, a silicon oxide layer, a titanium oxide layer, or an aluminum oxide layer.

The second capacitor electrode CAE2 may be disposed on the first interlayer insulating film 141. Since the first interlayer insulating film 141 has a predetermined dielectric constant, the first capacitor electrode CAE1, the second capacitor electrode CAE2, and the first interlayer insulating film 141 disposed between the first capacitor electrode CAE1 and the second capacitor electrode CAE2 may form the capacitor CAP. The second capacitor electrode CAE2 may be a single layer or a multilayer made of any one or more of molybdenum (Mo), aluminum (Al), chromium (Cr), gold (Au), titanium (Ti), nickel (Ni), neodymium (Ne), copper (Cu), and alloys of the same.

A second interlayer insulating film 142 may be disposed on the second capacitor electrode CAE2. The second interlayer insulating film 142 may be made of an inorganic layer such as a silicon nitride layer, a silicon oxynitride layer, a silicon oxide layer, a titanium oxide layer, or an aluminum oxide layer. The second interlayer insulating film 142 may include a plurality of inorganic layers.

A first pixel connection electrode ANDE1 may be disposed on the second interlayer insulating film 142. The first pixel connection electrode ANDE1 may be connected to the first drain electrode D1 of the first thin-film transistor ST1 through a first pixel contact hole ANCT1 penetrating the first interlayer insulating film 141 and the second interlayer insulating film 142 to expose the first drain electrode D1 of the first thin-film transistor ST1. The first pixel connection electrode ANDE1 may be a single layer or a multilayer made of any one or more of molybdenum (Mo), aluminum (Al), chromium (Cr), gold (Au), titanium (Ti), nickel (Ni), neodymium (Nd), copper (Cu), and alloys of the same.

A first organic layer 160 for planarization may be disposed on the first pixel connection electrode ANDE1. The first organic layer 160 may be made of acryl resin, epoxy resin, phenolic resin, polyamide resin, polyimide resin, or the like.

A second pixel connection electrode ANDE2 may be disposed on the first organic layer 160. The second pixel connection electrode ANDE2 may be connected to the first pixel connection electrode ANDE1 through a second pixel contact hole ANCT2 penetrating the first organic layer 160 to expose the first pixel connection electrode ANDE1. The second pixel connection electrode ANDE2 may be offset from the first pixel connection electrode ANDE1. The second pixel connection electrode ANDE2 may be a single layer or a multilayer made of any one or more of molybdenum (Mo), aluminum (Al), chromium (Cr), gold (Au), titanium (Ti), nickel (Ni), neodymium (Nd), copper (Cu), and alloys of the same.

A second organic layer 180 may be disposed on the second pixel connection electrode ANDE2. The second organic layer 180 may be made of acryl resin, epoxy resin, phenolic resin, polyamide resin, polyimide resin, or the like.

In an embodiment of the present inventive concept, the second pixel connection electrode ANDE2 and the second organic layer 180 may be omitted. In this case, the first pixel connection electrode ANDE1 may be directly connected to a light-emitting pixel electrode 171. For example, the first pixel connection electrode ANDE1 may be directly connected to the light-emitting pixel electrode 171 through a contact hole in the first organic layer 160.

In FIG. 9, the first thin-film transistor ST1 is firmed as a top-gate type transistor in which the first gate electrode G1 is located above the first active layer ACT1. However, the present inventive concept is not limited thereto. The first thin-film transistor ST1 may also be formed as a bottom-gate type transistor in which the first gate electrode G1 is located under the first active layer ACT1 or a double-gate type transistor in which the first gate electrode G1 is located both above and under the first active layer ACT1.

The light emitting elements LEL and a bank 190 may be disposed on the second organic layer 180. Each of the light emitting elements LEL includes the light-emitting pixel electrode 171, the light emitting layer 172, and a light-emitting common electrode 173.

The light-emitting pixel electrode 171 may be formed on the second organic layer 180. The light-emitting pixel electrode 171 may be connected to the second pixel connection electrode ANDE2 through a third pixel contact hole ANCT3 penetrating the second organic layer 180 to expose the second pixel connection electrode ANDE2.

In a top emission structure in which light is emitted from the light emitting layer 172 toward the light-emitting common electrode 173, the light-emitting pixel electrode 171 may be made of a metal material having high reflectivity, such as a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. The APC alloy is an alloy of silver (Ag), palladium (Pd), and copper (Cu).

The bank 190 may be formed on the second organic layer 180 to separate the light-emitting pixel electrode 171 from another light-emitting pixel electrode 171 to define an emission area. The bank 190 may cover edges of the light-emitting pixel electrode 171. The bank 190 may be made of an organic layer such as acryl resin, epoxy resin, phenolic resin, polyamide resin, or polyimide resin.

The emission area is an area in which the light-emitting pixel electrode 171, the light emitting layer 172 and the light-emitting common electrode 173 are sequentially stacked so that holes from the light-emitting pixel electrode 171 and electrons from the light-emitting common electrode 173 combine together in the light emitting layer 172 to emit light.

The light emitting layer 172 is formed on the light-emitting pixel electrode 171 and the bank 190. The light emitting layer 172 may include an organic material to emit light of a predetermined color. For example, the light emitting layer 172 may include a hole transporting layer, an organic material layer, and an electron transporting layer.

The light-emitting common electrode 173 is formed on the light emitting layer 172, The light-emitting common electrode 173 may cover the light emitting layer 172. The light-emitting common electrode 173 may be a common layer common to all emission areas. A capping layer may be formed on the light-emitting common electrode 173.

In the top emission structure, the light-emitting common electrode 173 may be made of a transparent conductive oxide (TCO) capable of transmitting light, such as indium tin oxide (ITO) or indium zinc oxide (IZO), or a semi-transmissive conductive material such as magnesium (Mg), silver (Ag) or an alloy of Mg and Ag. When the light-emitting common electrode 173 is made of a semi-transmissive conductive material, light output efficiency may be increased by microcavity.

An encapsulation layer TFE may be disposed on the light-emitting common electrode 173. The encapsulation layer TFE includes at least one inorganic layer to prevent oxygen or moisture from permeating into the light emitting element layer. In addition, the encapsulation layer TFE includes at least one organic layer to protect the light emitting element layer from foreign substances such as dust. For example, the encapsulation layer TFE includes a first encapsulating inorganic layer TFE1, an encapsulating organic layer TFE2, and a second encapsulating inorganic layer TFE3.

The first encapsulating inorganic layer TFE1 may be disposed on the light-emitting common electrode 173, the encapsulating organic layer TFE2 may be disposed on the first encapsulating inorganic layer TFE1 and the second encapsulating inorganic layer TFE3 may be disposed on the encapsulating organic layer TFE2. Each of the first encapsulating inorganic layer TFE1 and the second encapsulating inorganic layer TEES may be a multilayer in which one or more inorganic layers selected from a silicon nitride layer, a silicon oxynitride layer, a silicon oxide layer, a titanium oxide layer, and an aluminum oxide layer are alternately stacked. The encapsulating organic layer TFE2 may be made of acryl resin, epoxy resin, phenolic resin, polyamide resin, polyimide resin, or the like.

Figure 10:
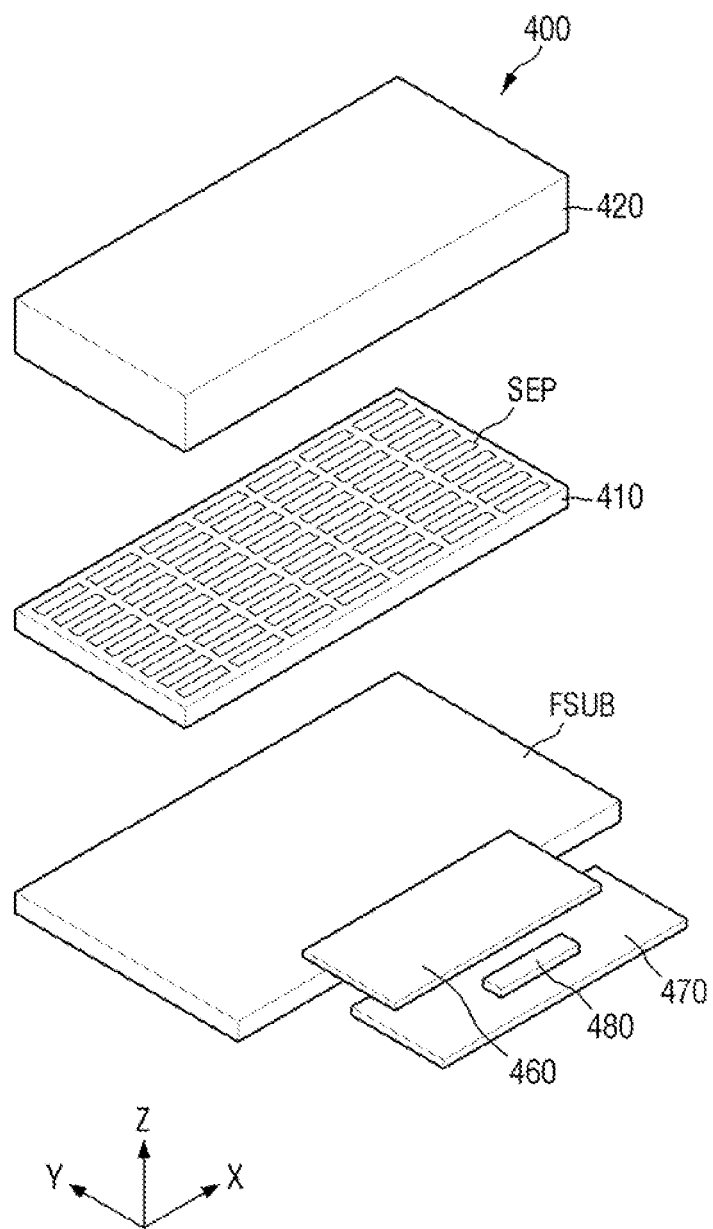
FIG. 10 is an exploded perspective view of an example of the fingerprint sensor of FIG. 1.

FIG. 10 is an exploded perspective view of an example of the fingerprint sensor 400 of FIG. 1.

Referring to FIG. 10, the fingerprint sensor 400 may include a fingerprint sensor substrate FSUB, a light sensing layer 410, a light guide unit 420, a flexible film 460, a sensor circuit board 470, and a sensor driving circuit 480.

The fingerprint sensor substrate FSUB may be made of an insulating material such as glass or polymer resin. For example, the fingerprint sensor substrate FSUB may include polyimide. The fingerprint sensor substrate FSUB may be a flexible substrate that can be bent, folded, rolled, and the like.

The light sensing layer 410 may be disposed on the fingerprint sensor substrate FSUB. The light sensing layer 410 may include sensor pixels SEP.

The light guide unit 420 may be disposed on the light sensing layer 410. The light guide unit 420 may include any one of the lens array LA, the collimator COM and the light blocking layer LSL as illustrated in FIGS. 6 through 8, but the present inventive concept is not limited thereto. For example, the light guide unit 420 may include another element capable of guiding light other than the lens array LA, the collimator COM and the light blocking layer LSL illustrated in FIGS. 6 through 8. For example, the light guide unit 420 may include an optical fiber for guiding light.

A side of the flexible film 460 may be disposed on the fingerprint sensor substrate FSUB not covered by the light sensing layer 410. For example, the flexible film 460 may be spaced apart from the light sensing layer 140 on the fingerprint sensor substrate FSUB. The side of the flexible film 460 may be disposed on fingerprint pads FP1 and FP2 (see FIG. 11) of the fingerprint sensor substrate FSUB. For example, a first side of the flexible film 460 may be disposed on the fingerprint pads FP1 and FP2 (see FIG. 11) of the fingerprint sensor substrate FSUB. The side of the flexible film 460 may be attached to the fingerprint pads FP1 and FP2 (see FIG. 11) through a conductive adhesive member such as an anisotropic conductive film. Therefore, the flexible film 460 may be electrically connected to the fingerprint pads FP1 and FP2 (see FIG. 11).

The other side of the flexible film 460 may be disposed on the sensor circuit board 470, For example, a second side of the flexible film 460 may be disposed on the second circuit board 470. The other side of the flexible film 460 may be attached to the sensor circuit board 470 through a conductive adhesive member such as an anisotropic conductive film. Therefore, the flexible film 460 may be electrically connected to the sensor circuit board 470.

The flexible film 460 may be a chip-on-film. The sensor circuit board 470 may be a flexible printed circuit board or a printed circuit board.

The sensor driving circuit 480 may be disposed on the sensor circuit board 470, but the present inventive concept is not limited thereto. The sensor driving circuit 480 may also be disposed on the flexible film 460. The sensor driving circuit 480 may receive sensing voltages of the sensor pixels SEP of the light sensing layer 410 through the flexible film 460 and the sensor circuit board 470. Therefore, the sensor driving circuit 480 may determine how much light has been incident on a light sensing element PD of each sensor pixel SEP through the sensing voltage of the sensor pixel SEP. Since the sensing driving circuit 480 can sense the amount of light incident on each sensor pixel SEP, it can recognize a user's fingerprint pattern.

Figure 11:
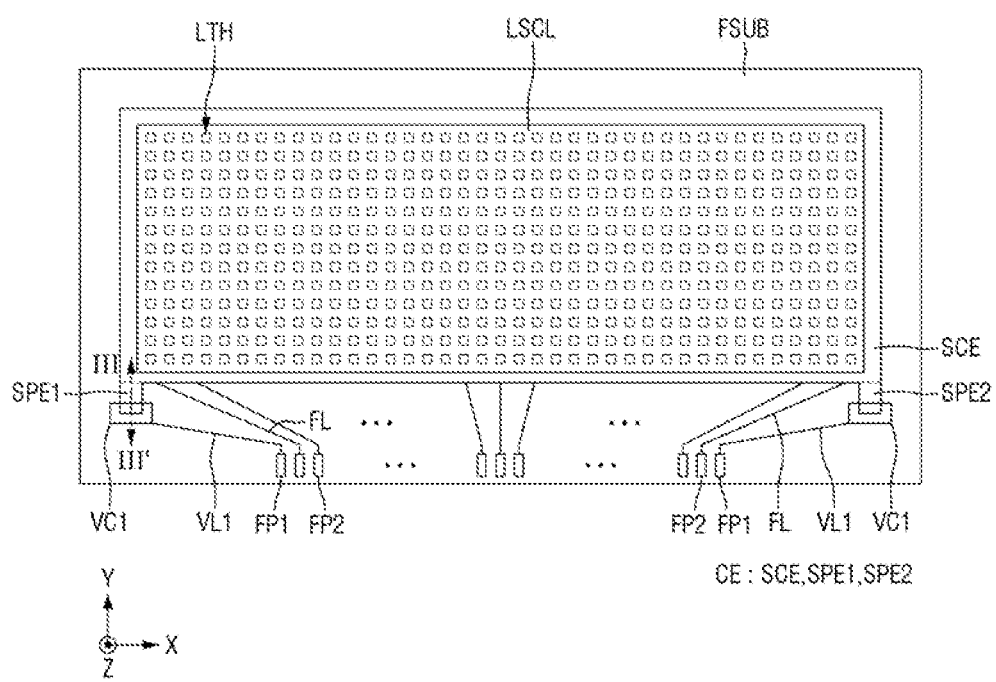
FIG. 11 is a layout view of a fingerprint sensor according to an embodiment of the present inventive concept.

FIG. 11 is a layout view of a fingerprint sensor 400 according to an embodiment of the present inventive concept.

For ease of description, a fingerprint sensor substrate FSUB, fingerprint pads FP1 and FP2, common voltage lines VL1, fan-out lines FL, first connection electrodes VC1, a common electrode CE, a light-blocking conductive layer LSCL and light transmitting holes LTH of the fingerprint sensor 400 are illustrated in FIG. 11.

Referring to FIG. 11, first fingerprint pads FP1 and second fingerprint pads FP2 may be disposed on a side (e.g., a lower side) of the fingerprint sensor substrate FSUB. The first fingerprint pads FP1 and the second fingerprint pads FP2 may be arranged in the first direction (X-axis direction). Any one of the first fingerprint pads FP1 may be disposed on a left side of the second fingerprint pads FP2, and the other may be disposed on a right side of the second fingerprint pads FP2. For example, one of the first fingerprint pads FP1 may be disposed on a first side of the second fingerprint pads FP2 and another one of the first fingerprint pads FP1 may be disposed on a second side of the second fingerprint pads FP2. In other words, the first fingerprint pads FP1 may be located at the leftmost and rightmost edges of the fingerprint pad arrangement. The second fingerprint pads FP2 may be disposed between the first fingerprint pads FP1. The first fingerprint pads FP1 and the second fingerprint pads FP2 may be electrically connected to a flexible film 460 through a conductive adhesive member such as an anisotropic conductive film.

The first fingerprint pads FP1 may be connected to the common voltage lines VL1, respectively. Each of the common voltage lines VL1 may be connected to the first connection electrode VC1 disposed on a left side or a right side of the fingerprint sensor substrate FSUB.

The second fingerprint pads FP2 may be connected to the fan-out lines FL, respectively. The fan-out lines FL may be connected to sensing lines RL (see FIG. 5) and fingerprint scan lines RSL (see FIG. 5). In other words, the sensing lines RL may be connected to the second fingerprint pads FP2 through the fan-out lines FL, and the fingerprint scan lines RSL may be connected to the second fingerprint pads FP2 through the fan-out lines FL.

The common electrode CE may overlap light sensing elements PD (see FIG. 13) of sensor pixels SEP in the third direction (Z-axis direction). The common electrode CE may be connected to P-type semiconductor layers PL (see FIG. 13) of semiconductor layers PSEM (see FIG. 13) of the light sensing elements PD (see FIG. 13) of the sensor pixels SEP. A common voltage or a ground voltage may be applied to the common electrode CE.

The common electrode CE may include a connecting portion SCE, a first protruding portion SPE1, and a second protruding portion SPE2. The connecting portion SCE indicates an area of the common electrode CE which is connected to the P-type semiconductor layers PL (see FIG. 13) of the semiconductor layers PSEM (see FIG. 13) of the light sensing elements PD (see FIG. 13) of the sensor pixels SEP. The first protruding portion SPE1 indicates an area protruding from a lower left end of the connecting portion SCE. The first protruding portion SPE1 may be connected to a first connection electrode VC1. For example, in a plan view, the first protruding portion SPE1 may overlap the first connection electrode VC1. The second protruding portion SPE2 indicates an area protruding from a lower right end of the connecting portion SCE. The second protruding portion SPE2 may be connected to another first connection electrode VC1. For example, in a plan view, the second protruding portion SPE2 may overlap the second connection electrode VC2.

The light-blocking conductive layer LSCL may be disposed on the common electrode CE. The light-blocking conductive layer LSCL may contact the common electrode CE. For example, the light-blocking conductive layer LSCL may directly contact the common electrode CE. This way signals may be passed from the common electrode CE to the light-blocking conductive layer LSCL. The light-blocking conductive layer LSCL may include the light transmitting holes LTH. The light transmitting holes LTH may overlap the light sensing elements PD of the sensor pixels SEP in the third direction (Z-axis direction). The light transmitting holes LTH may be disposed on the light sensing elements PD of the sensor pixels SEP.

The first fingerprint pads FP1 may receive the common voltage or the ground voltage from the flexile film 460. Therefore, the common voltage or the ground voltage may be applied to the common electrode CE through the first fingerprint pads FP1, the common voltage lines VL1, and the first connection electrodes VC1. In addition, since the light-blocking conductive layer LSCL contacts the common electrode CE, the common voltage or the ground voltage may be applied to the light-blocking conductive layer LSCL.

As illustrated in FIG. 11, the common voltage or the ground voltage may be applied to the common electrode CE and the light-blocking conductive layer LSCL through the first fingerprint pads FP1, the common voltage lines VL1, and the first connection electrodes VC1. Therefore, the light-blocking conductive layer LSCL can prevent or reduce the scan signals of the scan lines SL of the display panel 300 from being coupled to sensing signals of the sensing lines RL of the fingerprint sensor 400 by a parasitic capacitance Cp. Accordingly, noise due to the scan signals of the scan lines SL of the display panel 300 can be prevented or reduced from being reflected in the sensing signals of the sensing lines RL of the fingerprint sensor 400 by the parasitic capacitance Cp.

In addition, since the light-blocking conductive layer LSCL includes the light transmitting holes LTH overlapping the light sensing elements PD of the sensor pixels SEP in the third direction (Z-axis direction), it can block noise light from entering the light sensing elements PD of the sensor pixels SEP. Therefore, noise light incident on the light sensing elements PD of the sensor pixels SEP can be minimized.

Figure 12A:
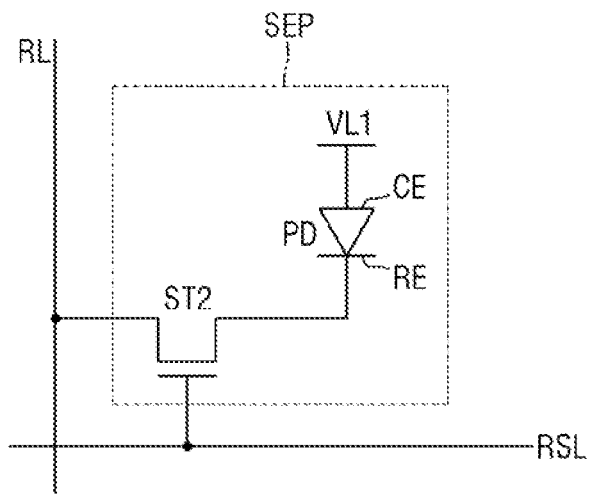
FIG. 12A is a circuit diagram illustrating sensor pixels according to an embodiment of the present inventive concept.
Figure 12B:
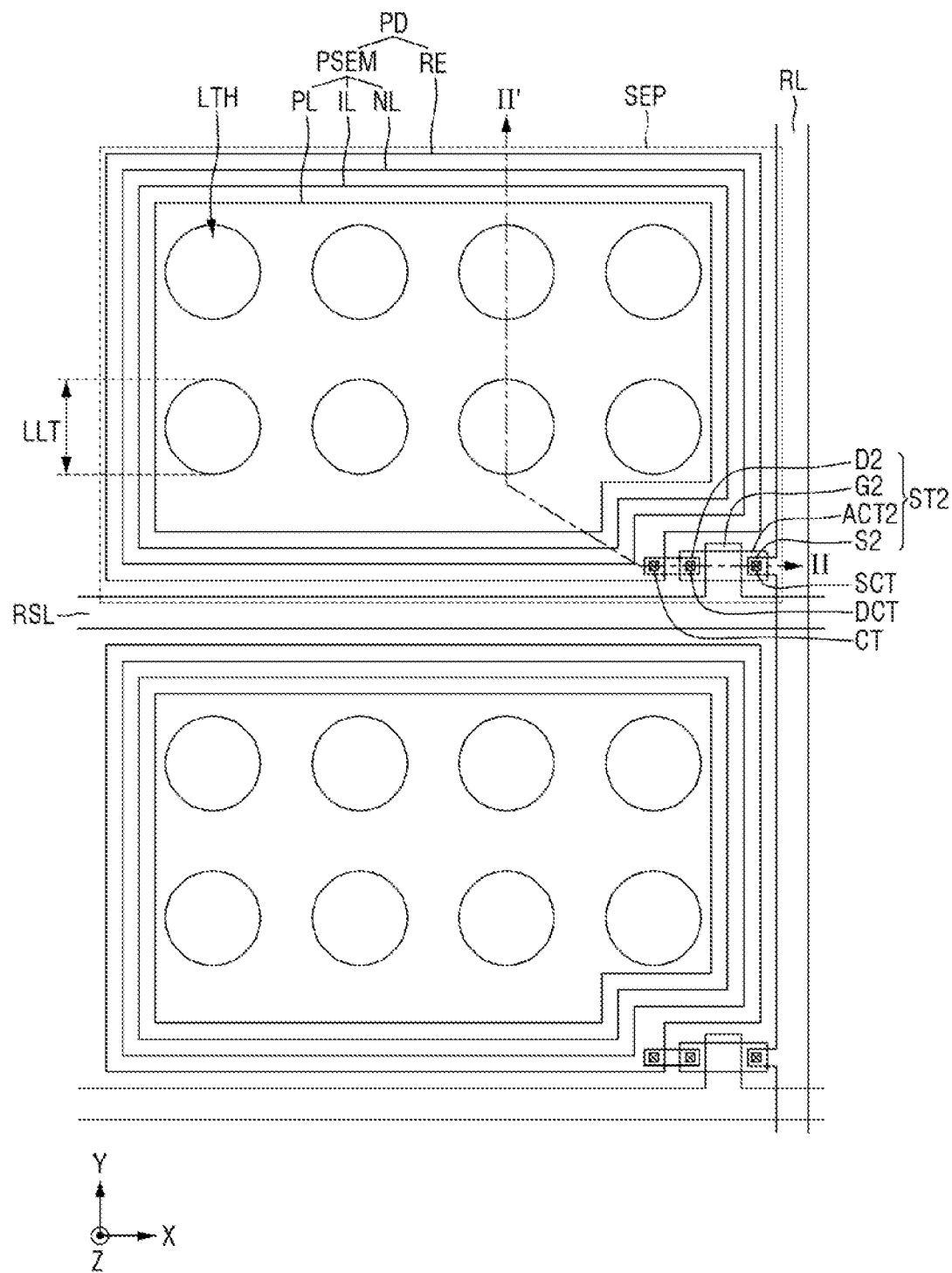
FIG. 12B is a layout view illustrating Sensor pixels according to an embodiment of the present inventive concept.

FIG. 12A is a circuit diagram illustrating sensor pixels according to an embodiment of the present inventive concept. FIG. 12B is a layout view illustrating sensor pixels according to an embodiment of the present inventive concept.

Referring to FIG. 12A and FIG. 12B, a light sensing layer 410 of a fingerprint sensor 400 includes fingerprint scan lines RSL, sensing lines RL, and sensor pixels SER Each of the sensor pixels SEP includes a second thin-film transistor ST2 and a light sensing element PD. For ease of description, a common electrode CE (see FIG. 11) and a light-blocking conductive layer LSCL are not illustrated in FIG. 12B.

The fingerprint scan lines RSL may extend in the first direction (X-axis direction) and may be arranged in the second direction (Y-axis direction). The sensing lines RL may extend in the second direction (Y-axis direction) and may be arranged in the first direction (X-axis direction).

The second thin-film transistor ST2 includes a second gate electrode G2, a second active layer ACT2, a second source electrode S2, and a second drain electrode D2.

The second gate electrode G2 may protrude from a fingerprint scan line RSL in the second direction (Y-axis direction).

The second active layer ACT2 may overlap the second gate electrode G2 in the third direction (Z-axis direction).

The second source electrode S2 may protrude from a sensing line RL in the first direction (X-axis direction). The second source electrode S2 may be connected to a side of the second active layer ACT2 through a source contact hole SCT.

The second drain electrode D2 may be connected to the other side of the second active layer ACT2 through a drain contact hole DCT.

The light sensing element PD includes a sensing electrode RE, a semiconductor layer PSEM, and the common electrode CE (see FIG. 11). The semiconductor layer PSEM may include a P-type semiconductor layer PL, an I-type semiconductor layer IL, and an N-type semiconductor layer NL.

The sensing electrode RE may be connected to the second drain electrode D2 through a connection contact hole CT. The N-type semiconductor layer NL may be disposed on the sensing electrode RE. The sensing electrode RE may contact the N-type semiconductor layer NL. The area of the sensing electrode RE may be larger than the area of the N-type semiconductor layer NL.

The I-type semiconductor layer IL may be disposed on the N-type semiconductor layer NL. The N-type semiconductor layer NE may contact the I-type semiconductor layer IL. The area of the N-type semiconductor layer NE may be larger than the area of the I-type semiconductor layer IL.

The P-type semiconductor layer PL may be disposed on the I-type semiconductor layer IL. The I-type semiconductor layer IL may contact the P-type semiconductor layer PL. The area of the I-type semiconductor layer IL may be larger than the area of the P-type semiconductor layer PL.

The common electrode CE (see FIG. 11) may be disposed on the P-type semiconductor layer PL. The common electrode CE (see FIG. 11) may be commonly disposed on the P-type semiconductor layers PL of the sensor pixels SEP.

The light-blocking conductive layer LSCL (see FIG. 11) may be disposed on the common electrode CE (see FIG. 11). Light transmitting holes LTH of the light-blocking conductive layer LSCL (see FIG. 11) may overlap the light sensing elements PD of the sensor pixels SEP. In FIG. 12B, eight light transmitting holes LTH overlap the light sensing element PD of each sensor pixel SEP. However, the number of light transmitting holes LTH overlapping the light sensing element PD of each sensor pixel SEP is not limited thereto. For example, more than eight or fewer than eight light transmitting holes LTH may overlap the light sensing element PD of each sensor pixel SEP.

Figure 13:
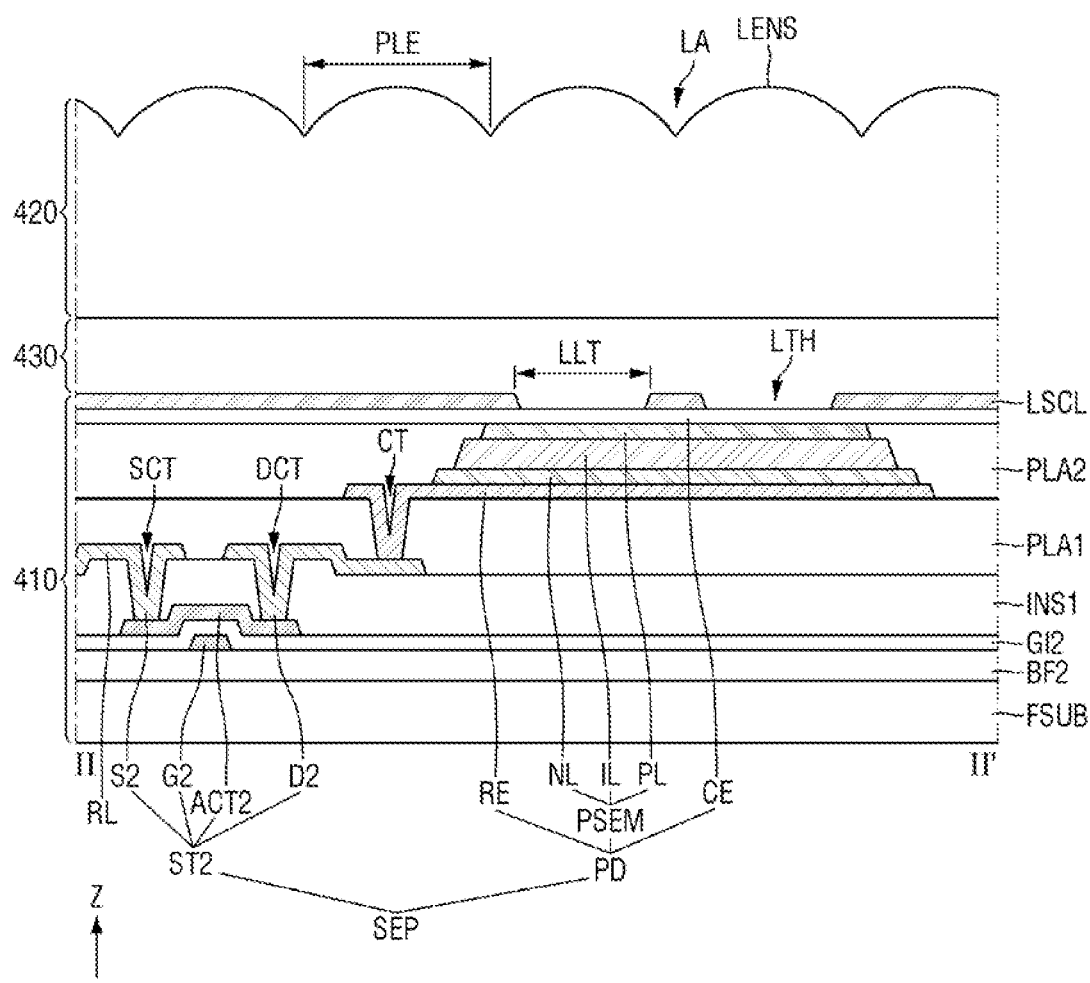
FIG. 13 is a cross-sectional view of an example of the fingerprint sensor taken along line II-II' of FIG. 12B.

FIG. 13 is a cross-sectional view of an example of the fingerprint sensor 400 taken along line II-II' of FIG. 12B.

Referring to FIG. 13, a light sensing layer 410 may include sensor pixels SEP that sense light. Each of the sensor pixels SEP may include a second thin-film transistor ST2 and a light sensing element PD.

A second buffer layer BF2 may be disposed on a fingerprint sensor substrate FSUB. The second buffer layer BF2 is a layer for protecting the second thin-film transistor ST2 and the light sensing element PD of the light sensing layer 410 from moisture introduced through the fingerprint sensor substrate FSUB which is vulnerable to moisture permeation. The second buffer layer BF2 may be composed of a plurality of inorganic layers stacked alternately. For example, the second buffer layer BF2 may be a multilayer in which one or more inorganic layers selected from a silicon nitride layer, a silicon oxynitride layer, a silicon oxide layer, a titanium oxide layer, and an aluminum oxide layer, are alternately stacked.

A second gate electrode G2 of the second thin-film transistor ST2 may be disposed on the second buffer layer BF2. The second gate electrode G2 may be a single layer or a multilayer made of any one or more of molybdenum (Mo), aluminum (Al), chromium (Cr), gold (Au), titanium (Ti), nickel (Ni), neodymium (Nd), copper (Cu), and alloys of the same.

A second gate insulating layer GI2 may be disposed on the second gate electrode G2. The second gate insulating layer GI2 may be made of an inorganic layer such as a silicon nitride layer, a silicon oxynitride layer, a silicon oxide layer, a titanium oxide layer, or an aluminum oxide layer.

A second active layer ACT2 of the second thin-film transistor ST2 may be disposed on the second gate insulating layer GI2. The second active layer ACT2 includes polycrystalline monocrystalline silicon, low-temperature polycrystalline silicon, amorphous silicon, or an oxide semiconductor. The second active layer ACT2 may overlap the second gate electrode G2 in the third direction (Z-axis direction) which is the thickness direction of the fingerprint sensor substrate FSUB.

A first insulating layer INS1 may be disposed on the second active layer ACT2. The first insulating layer INS1 may be made of an inorganic layer such as a silicon nitride layer, a silicon oxynitride layer, a silicon oxide layer, a titanium oxide layer, or an aluminum oxide layer. The first insulating layer INS1 may include a plurality of inorganic layers.

A second source electrode S2 and a second drain electrode D2 of the second thin-film transistor ST2 may be disposed on the first insulating layer INS1. The second source electrode S2 may be connected to the second active layer ACT2 through a source contact hole SCT penetrating the first insulating layer INS1. The second drain electrode D2 may be connected to the second active layer ACT2 through a drain contact hole DCT penetrating the first insulating layer INS1. The second source electrode S2 and the second drain electrode D2 may not overlap the second gate electrode G2 in the third direction (Z-axis direction).

A first planarization layer PLA1 may be disposed on the second source electrode S2 and the second drain electrode D2. The first planarization layer PLA1 may be made of an organic layer such as acryl resin, epoxy resin, phenolic resin, polyamide resin, or polyimide resin.

The light sensing element PD may be disposed on the first planarization layer PLA1 The light sensing element PD may be formed as a photodiode as illustrated in FIG. 13. However, the present inventive concept is not limited thereto. The light sensing element PD may also be formed as a phototransistor. When the light sensing element PD is a photodiode, it may include a sensing electrode RE, a semiconductor layer PSEM, and a common electrode CE. Here, the sensing electrode RE of the light sensing element PD may be a cathode, and the common electrode CE may be an anode.

The sensing electrode RE may be disposed on the first planarization layer PLA1. For example, the sensing electrode RE may be in direct contact with the first planarization layer PLA1 and be in direct contact with the sensing line RL through a contact hole CT. The sensing electrode RE may be a single layer of molybdenum (Mo), titanium (Ti), copper (Cu) or aluminum (Al) or may have a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide.

The semiconductor layer PSEM in which an N-type semiconductor layer NL, an I-type semiconductor layer IL and a P-type semiconductor layer PL are sequentially stacked may be disposed on the sensing electrode RE. When the semiconductor layer PSEM is formed in a PIN structure, the I-type semiconductor layer IL is depleted by the P-type semiconductor layer PL and the N-type semiconductor layer NL. Accordingly, an electric field is generated in the I-type semiconductor layer IL, and holes and electrons generated by light are drifted by the electric field. Therefore, the holes may be collected to the common electrode CE through the P-type semiconductor layer PL, and the electrons may be collected to the common electrode CE through the N-type semiconductor layer NL.

The P-type semiconductor layer PL may be disposed close to a surface on which external light is incident, and the N-type semiconductor layer NL may be disposed far away from the surface on which the external light is incident. Since drift mobility of holes is low compared with drift mobility of electrons, the P-type semiconductor layer PL may be formed close to the incident surface of the external light in order to maximize collection efficiency of incident light.

The N-type semiconductor layer NL may be disposed on the sensing electrode RE, the I-type semiconductor layer IL may be disposed on the N-type semiconductor layer NL, and the P-type semiconductor layer PL may be disposed on the I-type semiconductor layer IL. In this case, the P-type semiconductor layer PL may be formed by doping amorphous silicon (a-Si:H) with a P-type dopant. The I-type semiconductor layer IL may be made of amorphous silicon germanium (a-SiGe:H) or amorphous silicon carbide (a-SiC:H). The N-type semiconductor layer NL may be formed by doping amorphous silicon germanium (a-SiGe:H) or amorphous silicon carbide (a-SiC:H) with an N-type dopant. The P-type semiconductor layer PL and the N-type semiconductor layer NL may be formed to a thickness of about 500 Å, and the I-type semiconductor layer IL may be formed to a thickness of 5,000 to 10,000 Å.

Alternatively, the N-type semiconductor layer NL may be disposed on the sensing electrode RE, the I-type semiconductor layer IL may be omitted, and the P-type semiconductor layer PL may be disposed on the N-type semiconductor layer NL. In this case, the P-type semiconductor layer PL may be formed by doping amorphous silicon (a-Si:H) with a P-type dopant. The N-type semiconductor layer NL may be formed by doping amorphous silicon germanium (a-SiGe:H) or amorphous silicon carbide (a-SiC:H) with an N-type dopant. The P-type semiconductor layer PL and the N-type semiconductor layer NL may be formed to a thickness of about 500 Å.

In addition, an upper surface or a lower surface of at least any one of the sensing electrode RE, the P-type semiconductor layer PL, the I-type semiconductor layer IL, and the N-type semiconductor layer NL may be formed to have an uneven structure through a texturing process to increase an absorption rate of external light. The texturing process is a process of forming a material surface into an uneven structure and processing the material surface into a shape such as a fabric surface. The texturing process may be performed through an etching process using photolithography, an anisotropic etching process using a chemical solution, or a groove forming process using mechanical scribing.

A second planarization layer PLA2 may be disposed on side surfaces of the light sensing element PD. The second planarization layer PLA2 may cover side surfaces of the sensing electrode RE, the P-type semiconductor layer PL, the I-type semiconductor layer IL and the N-type semiconductor layer NL of the light sensing element PD and may not cover an upper surface of the P-type semiconductor layer PL. An upper surface of the second planarization layer PLA2 and the upper surface of the P-type semiconductor layer PL may be flat. The second planarization layer PLA2 may be made of an organic layer such as acryl resin, epoxy resin, phenolic resin, polyamide resin, or polyimide resin.

The common electrode CE may be disposed on the P-type semiconductor layer PL and the second planarization layer PLA2. The common electrode CE may be in direct contact with the P-type semiconductor layer PL and the second planarization layer PLA2. The common electrode CE may be made of a transparent conductive material capable of transmitting light, such as indium tin oxide (ITO) or indium zinc oxide (IZO).

A light-blocking conductive layer LSCL may be disposed on the common electrode CE. For example, the common electrode CE may be disposed between the light-blocking conductive layer LSLC and the second planarization layer PLA2. In addition, the common electrode CE may be disposed between the light-blocking conductive layer LSCL and the P-type semiconductor layer PL. The light-blocking conductive layer LSCL may include a metal material that does not transmit light or has low light transmittance. For example, the light-blocking conductive layer LSCL may be a single layer or a multi layer made of any one or more of molybdenum (Mo), aluminum (Al), chromium (Cr), gold (Au), titanium (Ti), nickel (Ni), neodymium (Nd), copper (Cu), and alloys of the same.

The light-blocking conductive layer LSCL may include light transmitting holes LTH. The light transmitting holes LTH may overlap the light sensing elements PD of the sensor pixels SEP in the third direction (Z-axis direction). Therefore, light passing through the light transmitting holes LTH may be incident on the light sensing elements PD of the sensor pixels SEP.

A light guide unit 420 may be disposed on the light-blocking conductive layer LSCL. The light guide unit 420 may be an element for providing or guiding light to each of the sensor pixels SEP. In FIG. 13, the light guide unit 420 includes a lens array LA having a plurality of lenses LENS. Each of the lenses LENS may be a convex lens that is convex upward. The lenses LENS may be disposed at the top of the light guide unit 420. The lenses LENS may form an upper surface of the light guide unit 420. The lens array LA may be made of polymer resin or plastic that can transmit light.

The lenses LENS may overlap the light transmitting holes LTH in the third direction (Z-axis direction). Therefore, light passing through the lenses LENS overlapping the light transmitting holes LTH in the third direction (Z-axis direction) may be incident on the light sensing elements PD through the light transmitting holes LTH. However, light passing through the lenses LENS not overlapping the light transmitting holes LTH in the third direction (Z-axis direction) may be blocked by the light-blocking conductive layer LSCL. Therefore, the light-blocking conductive layer LSCL can block noise light from entering the light sensing elements PD of the sensor pixels SEP.

Although one lens LENS overlaps one light transmitting hole LTH in the third direction (Z-axis direction) in FIG. 13, the present inventive concept is not limited thereto. For example, one lens LENS may overlap a plurality of light transmitting holes LTH in the third direction (Z-axis direction).

A pitch PLE of each lens LENS may be greater than a length LLT of each light transmitting hole LTH in the second direction (Y-axis direction of FIG. 12B). In addition, the pitch PLE of each lens LENS may be greater than a length LLT of each light transmitting hole LTH in the first direction (X-axis direction of FIG. 12B). The light-blocking conductive layer LSCL may overlap, in the third direction (Z-axis direction), a boundary between the lenses LENS adjacent to each other in the first direction (X-axis direction of FIG. 12) and the second direction (Y-axis direction of FIG. 12B).

A transparent adhesive member 430 may be disposed between the light sensing layer 410 and the light guide unit 420. The transparent adhesive member 430 may be a transparent adhesive resin such as OCR or a transparent adhesive film such as an OCA film.

As illustrated in FIG. 13, since the light-blocking conductive layer LSCL contacts the common electrode CE, a common voltage or a ground voltage applied to the common electrode CE may be applied to the light-blocking conductive layer LSCL. In other words, a common voltage or a ground voltage may be applied to the light-blocking conductive layer LSCL of each light sensing element PD. Therefore, the light-blocking conductive layer LSCL can prevent or reduce the scan signals of the scan lines SL of the display panel 300 from being coupled to sensing signals of sensing lines RL of the fingerprint sensor 400 by a parasitic capacitance Cp. Accordingly, noise due to the scan signals of the scan lines SL of the display panel 300 can be prevented or reduced from being reflected in the sensing signals of the sensing lines RL of the fingerprint sensor 400 by the parasitic capacitance Cp.

In addition, since the light-blocking conductive layer LSCL includes the light transmitting holes LTH overlapping the light sensing elements PD of the sensor pixels SEP in the third direction (Z-axis direction), it can block noise light from entering the light sensing elements PD of the sensor pixels SEP. Therefore, noise light incident on the light sensing elements PD of the sensor pixels SEP can be minimized.

A fingerprint sensor according to an embodiment of the present inventive concept includes: a substrate FSUB; a light sensing element PD that includes a sensing electrode RE disposed on the substrate, a semiconductor layer PSEM disposed on the sensing electrode, and a common electrode CE disposed on the semiconductor layer; a light-blocking conductive layer LCSL disposed on the common electrode and including light transmitting holes LTH; and a light guide unit 420 disposed on the light-blocking conductive layer.

Figure 14:
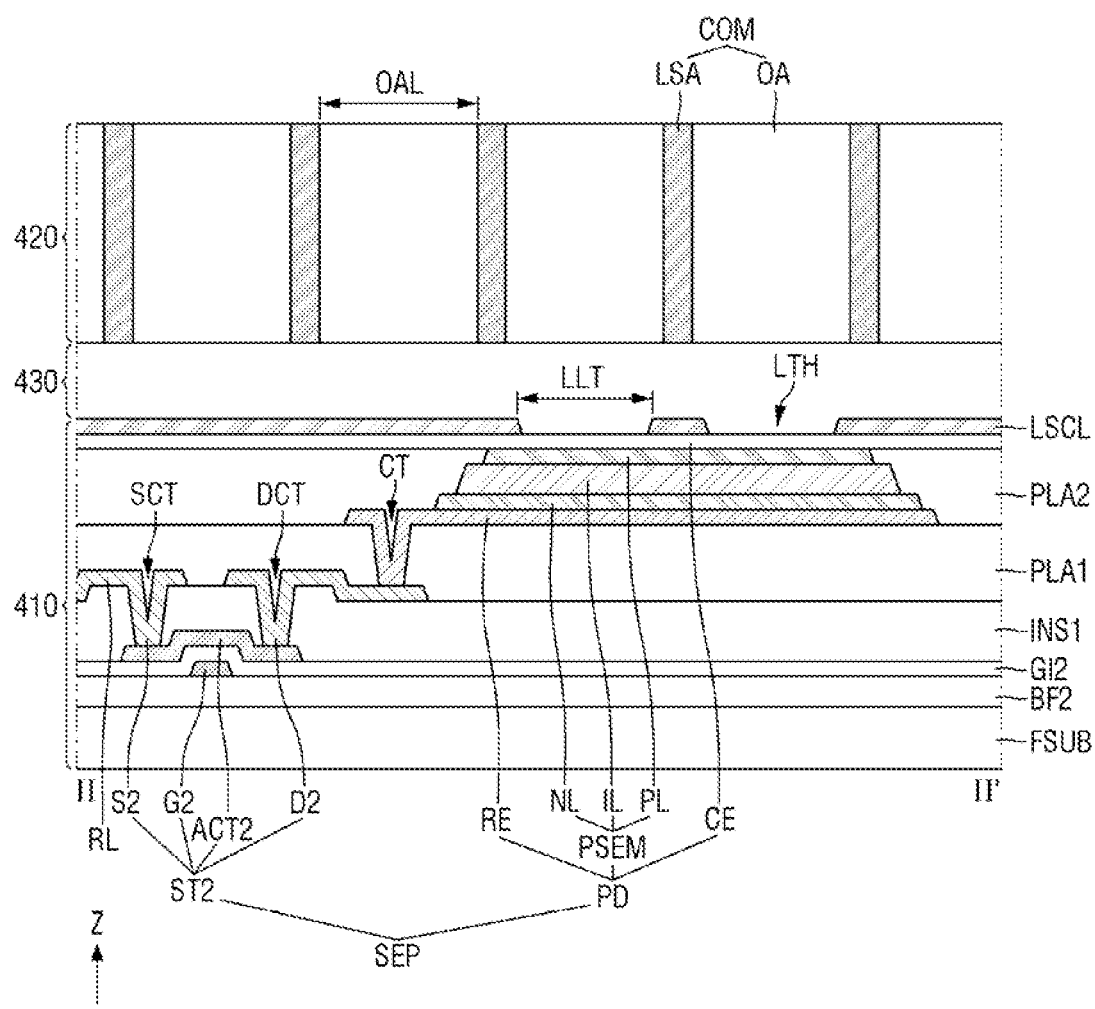
FIG. 14 is a cross-sectional view of an example of the fingerprint sensor taken along line II-II' of FIG. 12B.

FIG. 14 is a cross-sectional view of an example of the fingerprint sensor 400 taken along line II-II' of FIG. 12B.

The embodiment of FIG. 14 is different from the embodiment of FIG. 13 in that a light guide unit 420 includes a collimator COM instead of the lens array LA. In FIG. 14, differences from the embodiment of FIG. 13 will be mainly described.

Referring to FIG. 14, the collimator COM may include light transmitting areas OA which transmit light and a light blocking area LSA which blocks light. The light blocking area LSA may surround each of the light transmitting areas OA. The light blocking area LSA may be disposed between the light transmitting areas OA in one direction.

Each of the light transmitting areas OA may be a passage through which light reflected by a ridge RID and a valley VAL of a fingerprint of a finger F passes. Each of the light transmitting areas OA may be made of an organic layer such as acryl resin, epoxy resin, phenolic resin, polyamide resin, or polyimide resin.

The light blocking area LSA may be made of photosensitive resin capable of blocking light. For example, the light blocking area LSA may include an inorganic black pigment such as carbon black or an organic black pigment. The light blocking, area LSA may overlap a light-blocking conductive layer LSCL in the third direction (Z-axis direction).

The light transmitting areas OA may overlap light transmitting holes LTH in the third direction (Z-axis direction), Therefore, light passing through the light transmitting areas OA overlapping the light transmitting holes LTH in the third direction (Z-axis direction) may be incident on light sensing elements PD through the light transmitting holes LTH. However, light passing through the light transmitting areas OA not overlapping the light transmitting holes LTH in the third direction (Z-axis direction) may be blocked by the light-blocking conductive layer LSCL. Therefore, the light-blocking conductive layer LSCL can block noise light from entering the light sensing elements PD of sensor pixels SEP.

A size of each light transmitting area OA may be larger than a size of each light transmitting hole LTH. For example, a length OAL of each light transmitting area OA in the second direction (Y-axis direction of FIG. 12B) may be greater than a length LLT of each light transmitting hole LTH in the second direction (Y-axis direction of FIG. 12B). In addition, a length of each light transmitting area OA in the first direction (X-axis direction of FIG. 12B may be greater than a length LLT of each light transmitting hole LTH in the first direction (X-axis direction of FIG. 12B).

Figure 15:
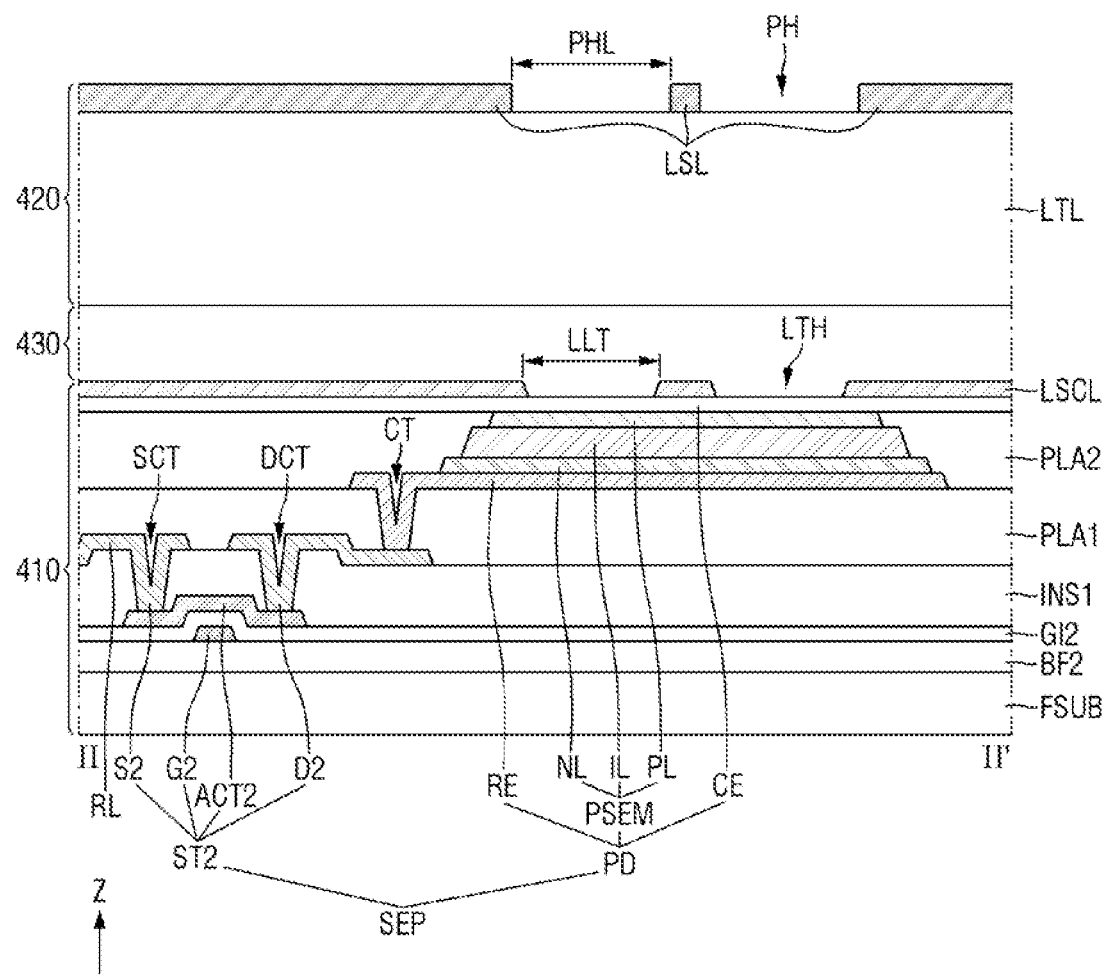
FIG. 15 is a cross-sectional view of an example of the fingerprint sensor taken along line II-II' of FIG. 12B.

FIG. 15 is a cross-sectional view of an example of the fingerprint sensor 400 taken along line II-II' of FIG. 12B.

The embodiment of FIG. 15 is different from the embodiment of FIG. 13 in that a light guide unit 420 includes a light blocking layer LSL having pinholes PH, instead of the lens array LA. In FIG. 15, differences from the embodiment of FIG. 13 will be mainly described.

Referring to FIG. 15, the light blocking layer LSL may include photosensitive resin capable of blocking light, for example, an inorganic black pigment such as carbon black or an organic black pigment. Alternatively, the light blocking layer LSL may include a metal material that does not transmit light or has low light transmittance. For example, the light blocking layer LSL may be a single layer or a multilayer made of any one or more of molybdenum (Mo), aluminum (Al), chromium (Cr), gold (Au), titanium (Ti), nickel (Ni), neodymium (Nd), copper (Cu), and alloys of the same. The light blocking layer LSL may overlap a light-blocking conductive layer LSCL in the third direction (Z-axis direction). The light blocking layer LSL may not completely overlap the light-blocking conductive layer LSCL in the third direction (Z-axis direction).

Each pinhole PH may be a passage through which light reflected by a ridge RID and a valley VAL of a fingerprint of a finger F passes. The pinholes PH may overlap light transmitting holes LTH in the third direction (Z-axis direction). Therefore, light passing through the pinholes PH overlapping the light transmitting holes LTH in the third direction (Z-axis direction) may be incident on light sensing elements PD through the light transmitting holes LTH. However, light passing through the pinholes PH not overlapping the light transmitting holes LTH in the third direction (Z-axis direction) may be blocked by the light-blocking conductive layer LSCL. Therefore, the light-blocking conductive layer LSCL can block noise light from entering the light sensing elements PD of sensor pixels SEP.

A size of each pinhole PH may be larger than a size of each light transmitting hole LTH. For example, a length PHL of each pinhole PH in the second direction (Y-axis direction of FIG. 12B) may be greater than a length LLT of each light transmitting hole LTH in the second direction (Y-axis direction of FIG. 12B). In addition, a length of each pinhole PH in the first direction (X-axis direction of FIG. 12B) may be greater than a length of each light transmitting hole LTH in the first direction (X-axis direction of FIG. 12B).

Figure 16:
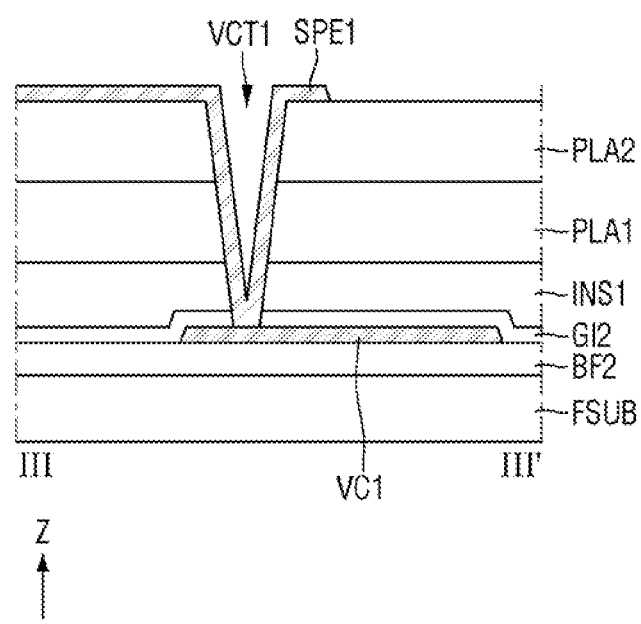
FIG. 16 is a cross-sectional view of an example of the fingerprint sensor taken along line III-III' of FIG. 11.

FIG. 16 is a cross-sectional view of an example of the fingerprint sensor 400 taken along line III-III' of FIG. 11.

In FIG. 16, a first protruding portion SPE1 of a common electrode CE is connected to a first connection electrode VC1 through a first connection contact hole VCT1.

Referring to FIG. 16, the first connection electrode VC1 may be disposed on a second buffer layer BF2. A common voltage line VL1 (see FIG. 11) connected to the first connection electrode VC1 may be disposed on the second buffer layer BF2. The first connection electrode VC1 and the common voltage line VL1 (see FIG. 11) may be disposed on the same layer as a second gate electrode G2 of a second thin-film transistor ST2 and may be made of the same material as the second gate electrode G2.

The first protruding portion SPE1 of the common electrode CE may be disposed on a second planarization layer PLA2 The first protruding portion SPE1 of the common electrode CE may be connected to the first connection electrode VC1 through the first connection contact hole VCT1 penetrating a second gate insulating layer GI2, a first insulating layer INS1, a first planarization layer PLA1, and the second planarization layer PLA2.

Since the first protruding portion SPE1 of the common electrode CE is connected to the first connection electrode VC1 through the first connection contact hole VCT1 as illustrated in FIG. 16, the common electrode CE may be electrically connected to a first fingerprint pad FP1. Therefore, the common electrode CE may receive a common voltage or a ground voltage through the first fingerprint pad FP1.

Figure 17:
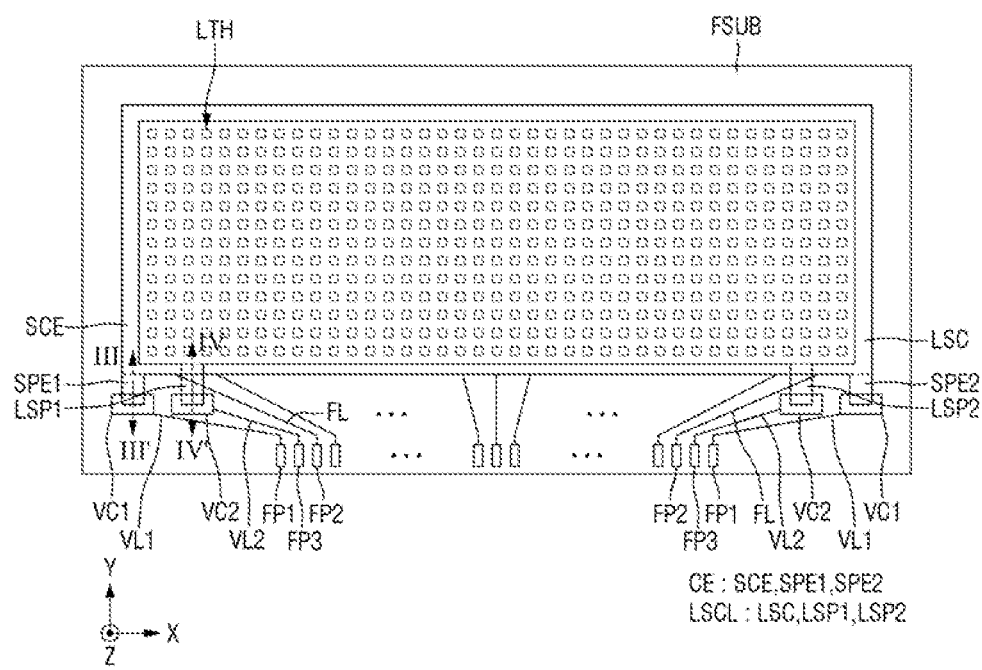
FIG. 17 is a layout view of a fingerprint sensor according to an embodiment of the present inventive concept.

FIG. 17 is a layout view of a fingerprint sensor 400 according to an embodiment of the present inventive concept.

The embodiment of FIG. 17 is different from the embodiment of FIG. 11 in that a light-blocking conductive layer LSCL is electrically insulated from a common electrode CE and receives a voltage different from a voltage, which is applied to the common electrode CE, through second connection electrodes VC2. In FIG. 17, differences from the embodiment of FIG. 11 will be mainly described.

Figure 18:
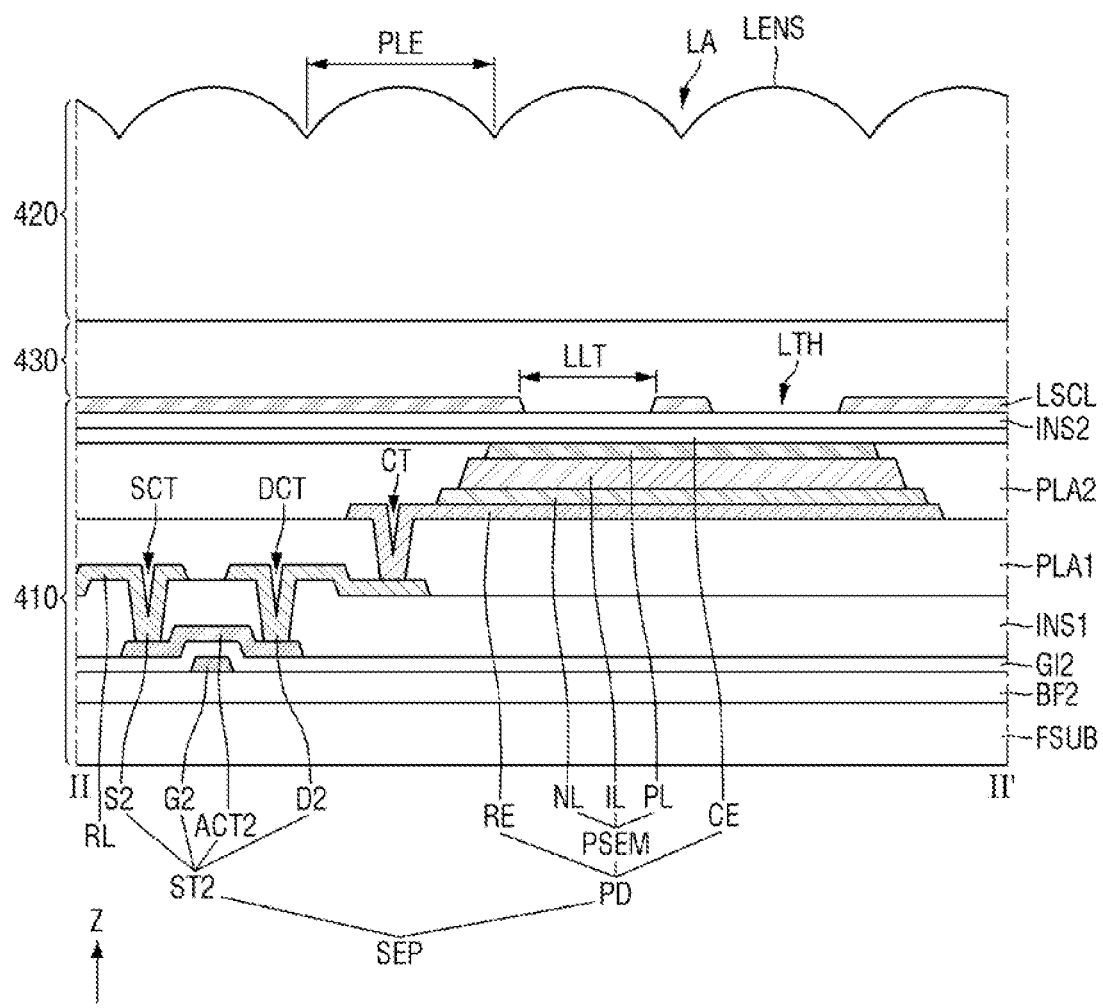
FIG. 18 is a cross-sectional view of an example of the fingerprint sensor taken along line II-II' of FIG. 12B.

Referring to FIG. 17, the light-blocking conductive layer LSCL may be disposed on the common electrode CE. The light-blocking conductive layer LSCL may not contact the common electrode CE. For example, as illustrated in FIG. 18, a second insulating layer INS2 may be disposed between the light-blocking conductive layer LSCL and the common electrode CE. Therefore, the light-blocking conductive layer LSCL may be electrically insulated from the common electrode CE. In other words, electrical signals may not pass from the common electrode CE to the light-blocking conductive layer LSCL. In this case, the common electrode CE may be applied with a common voltage while the light-blocking conductive layer LSCL is applied with a ground voltage.

The light-blocking conductive layer LSCL may include a light blocking portion LSC, a first light-blocking protruding portion LSP1, and a second light-blocking protruding portion LSP2. The light blocking portion LSC may overlap a connecting portion SCE of the common electrode CE in the third direction (Z-axis direction). The light blocking portion LSC may overlap light sensing elements PD (see FIG. 12B) of sensor pixels SEP in the third direction (Z-axis direction). The first light-blocking protruding portion LSP1 indicates an area protruding from a lower left end of the light blocking portion LSC. The first light-blocking protruding portion LSP1 may be adjacent to the first protruding portion SPE1. The first light-blocking protruding portion LSP1 may be connected to a second connection electrode VC2. The second light-blocking protruding portion LSP2 indicates an area protruding from a lower right end of the light blocking portion LSC. The second light-blocking protruding portion LSP2 may be adjacent to the second protruding portion SPE2. The second light-blocking protruding portion LSP2 may be connected to another second connection electrode VC2.

Third fingerprint pads FP3 may be disposed between first fingerprint pads FP1 and second fingerprint pads FP2. The first fingerprint pads FP1, the second fingerprint pads FP2, and the third fingerprint pads FP3 may be electrically connected to a flexible film 460 through a conductive adhesive member such as an anisotropic conductive film. Therefore, the first fingerprint pads FP1 may receive a common voltage from the flexible film 460, and the third fingerprint pads FP3 may receive a ground voltage from the flexible film 460.

The common voltage may be applied to the common electrode CE through the first fingerprint pads FP1, common voltage lines VL1, and first connection electrodes VC1. In addition, the ground voltage may be applied to the light-blocking conductive layer LSCL through the third fingerprint pads FP3, ground lines VL2, and the second connection electrodes VC2.

As illustrated in FIG. 17, the ground voltage may be applied to the light-blocking conductive layer LSCL through the third fingerprint pads FP3, the ground lines VL2, and the second connection electrodes VC2. Therefore, the light-blocking conductive layer LSCL can prevent or reduce the scan signals of the scan lines SL of the display panel 300 from being coupled to sensing signals of sensing lines RL of the fingerprint sensor 400 by a parasitic capacitance Cp. Accordingly, noise due to the scan signals of the scan lines SL of the display panel 300 can be prevented or reduced from being reflected in the sensing signals of the sensing lines RL of the fingerprint sensor 400 by the parasitic capacitance Cp.

In addition, since the light-blocking conductive layer LSCL includes light transmitting holes LTH overlapping the light sensing elements PD of the sensor pixels SEP in the third direction (Z-axis direction), it can block noise light from entering the light sensing elements PD of the sensor pixels SEP. Therefore, noise light incident on the light sensing elements PD of the sensor pixels SEP can be minimized.

FIG. 18 is a cross-sectional view of an example of the fingerprint sensor 400 taken along line II-II' of FIG. 12B.

The embodiment of FIG. 18 is different from the embodiment of FIG. 13 in that a second insulating layer INS2 is disposed between a common electrode CE and a light-blocking conductive layer LSCL. In FIG. 18, a redundant description of the same elements and features as those of the embodiment of FIG. 13 will be omitted.

Referring to FIG. 18, the second insulating layer INS2 may be disposed on the common electrode CE. Since the second insulating layer INS2 is made of an insulating material, the common electrode CE and the light-blocking conductive layer LSCL may be electrically insulated by the second insulating layer INS2.

The second insulating layer INS2 may be made of an inorganic layer such as a silicon nitride layer, a silicon oxynitride layer, a silicon oxide layer, a titanium oxide layer, or an aluminum, oxide layer. Alternatively, the second insulating layer INS2 may be made of an organic layer such as acryl resin, epoxy resin, phenolic resin, polyamide resin, or polyimide resin.

Figure 19:
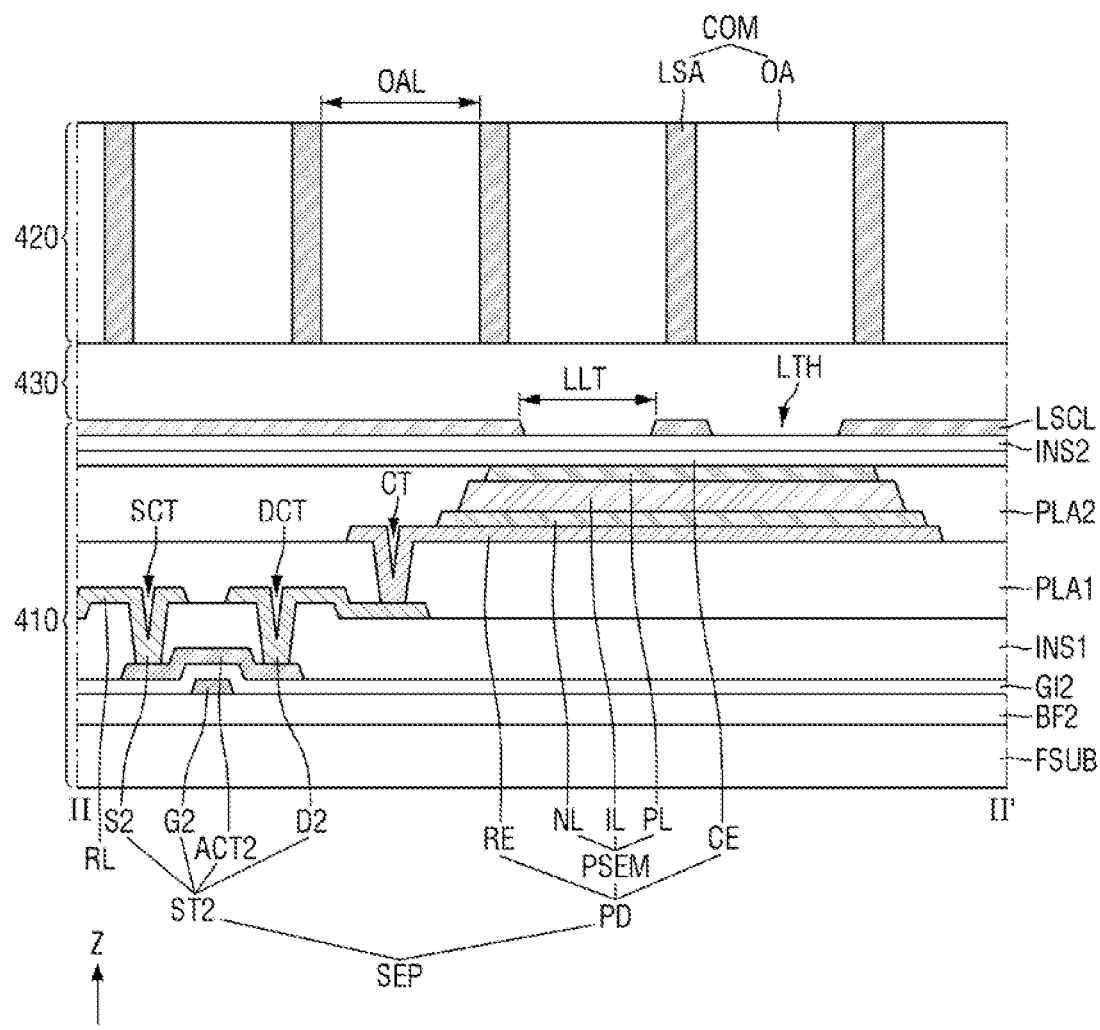
FIG. 19 is a cross-sectional view of an example of the fingerprint sensor taken along line II-II' of FIG. 12B.

FIG. 19 is a cross-sectional view of an example of the fingerprint sensor 400 taken along line II-II' of FIG. 12B.

The embodiment of FIG. 19 is different from the embodiment of FIG. 14 in that a second insulating layer INS2 is disposed between a common electrode CE and a light-blocking conductive layer LSCL. The second insulating layer INS2 is substantially the same as that described above in conjunction with FIG. 18 and thus will not be described here.

Figure 20:
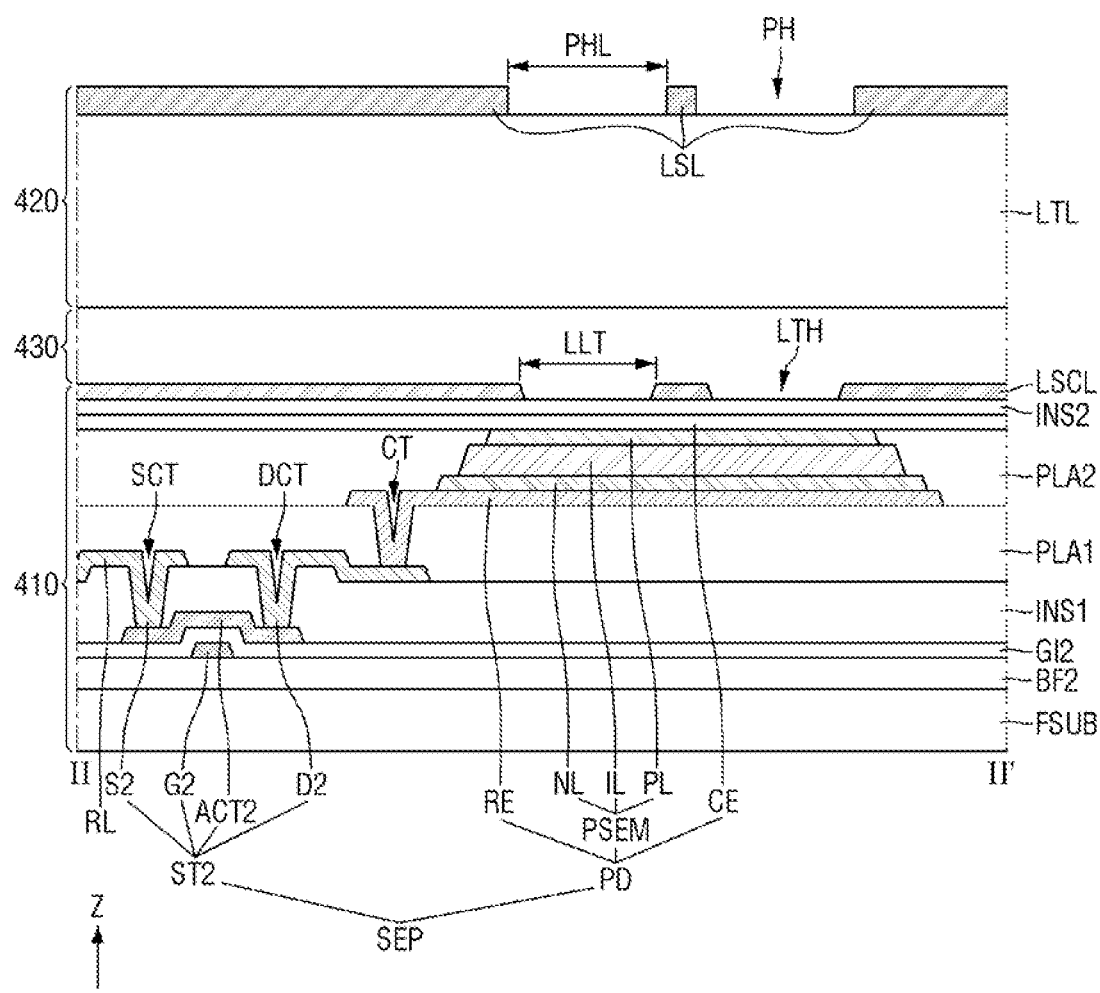
FIG. 20 is a cross-sectional view of an example of the fingerprint sensor taken along line II-II' of FIG. 12B.

FIG. 20 is a cross-sectional view of an example of the fingerprint sensor 400 taken along line II-II' of FIG. 12B.

The embodiment of FIG. 20 is different from the embodiment of FIG. 15 in that a second insulating layer INS2 is disposed between a common electrode CE and a light-blocking conductive layer LSCL. The second insulating layer INS2 is substantially the same as that described above in conjunction with FIG. 18 and thus will not be described here.

Figure 21:
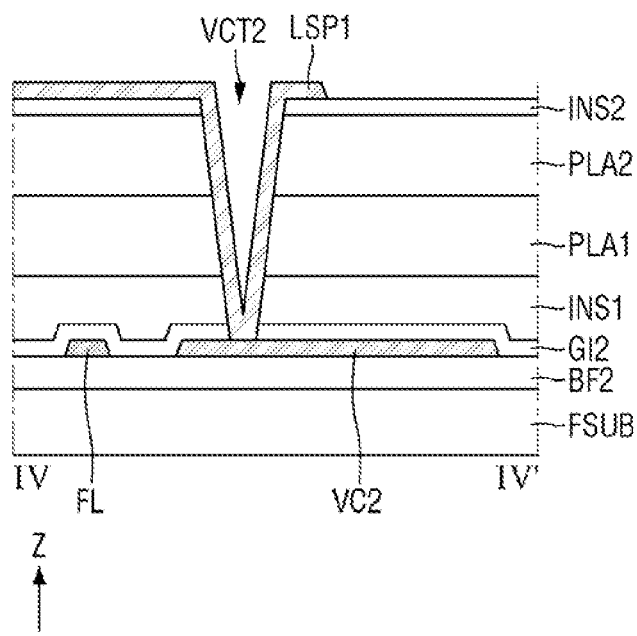
FIG. 21 is a cross-sectional view of an example of the fingerprint sensor taken along line IV-IV' of FIG. 17.

FIG. 21 is a cross-sectional view of an example of the fingerprint sensor 400 taken along line IV-IV' of FIG. 17.

In FIG. 21, a first light-blocking protruding portion LSP1 of a light-blocking conductive layer LSCL is connected to a second connection electrode VC2 through a second connection contact hole VCT2.

Referring to FIG. 21 the second connection electrode VC2 may be disposed on a second buffer layer BF2. A ground line VL2 (see FIG. 17) connected to the second connection electrode VC2 may be disposed on the second buffer layer BF2. The second connection electrode VC2 and die ground line VL2 (see FIG. 1) may be disposed on the same layer as a second gate electrode G2 of a second thin-film transistor ST2 and may be made of the same material as the second Rate electrode G2.

The first light-blocking protruding portion LSP1 of the light-blocking conductive layer LSCL may be disposed on a second insulating layer INS2. The first light-blocking protruding portion LSP1 of the light-blocking conductive layer LSCL may be electrically connected to the second connection electrode VC2 through the second connection contact hole VCT2 penetrating a second gate insulating layer GI2, a first insulating layer INS1, a first planarization layer PLA1, a second planarization layer PLA2, and the second insulating layer INS2.

Since the first light-blocking protruding portion LSP1 of the light-blocking conductive layer LSCL is connected to the second connection electrode VC2 through the second connection contact hole VCT2 as illustrated in FIG. 21, the light-blocking conductive layer LSCL may be electrically connected to a third fingerprint pad FP3. Therefore, the light-blocking conductive layer LSCL may receive a ground voltage through the third fingerprint pad FP3.

A cross-sectional view of the fingerprint sensor taken along line III-III' of FIG. 17 is substantially the same as that described above in conjunction with FIG. 16 and thus will not be described here.

In a fingerprint sensor and a display device including the same according to an embodiment of the present inventive concept, a common voltage or a ground voltage is applied to a light-blocking conductive layer disposed on a common electrode of each light sensing element. Therefore, the light-blocking conductive layer can prevent or reduce scan signals of scan lines of a display panel from being coupled to sensing signals of sensing lines of the fingerprint sensor by a parasitic capacitance. Accordingly, noise due to the scan signals of the scan lines of the display panel can be prevented or reduced from being reflected in the sensing signals of the sensing lines of the fingerprint sensor by the parasitic capacitance.

In a fingerprint sensor and a display device including the same according to an embodiment of the present inventive concept, since the light-blocking conductive layer includes light transmitting holes overlapping the light sensing elements, it can block noise light from entering the light sensing elements. Therefore, noise light incident on the light sensing elements can be minimized.

While embodiments of the present inventive concept has been particularly shown and described with reference to the accompanying drawings, it will be understood by those of ordinary skill in the art that various changes in form and detail may be made thereto.

What is claimed is:

1. A fingerprint sensor, comprising:
   a substrate;
   a light sensing element that includes a sensing electrode disposed on the substrate, a semiconductor layer disposed on the sensing electrode, and a common electrode disposed on the semiconductor layer;
   a light-blocking conductive layer disposed on the common electrode and including light transmitting holes; and
   a light guide unit disposed on the light-blocking conductive layer,
   the fingerprint sensor further comprising an insulating layer disposed on the common electrode,
   wherein the light-blocking conductive layer is disposed on the insulating layer, and
   wherein the light-blocking conductive layer is electrically insulated from the common electrode.

2. The fingerprint sensor of claim 1, wherein the common electrode includes a transparent conductive material.

3. The fingerprint sensor of claim 1, wherein a common voltage is applied to the common electrode, and a ground voltage is applied to the light-blocking conductive layer.

4. The fingerprint sensor of claim 1, further comprising:
   a first fingerprint pad disposed on a side of the substrate;
   a common voltage line connected to the first fingerprint pad; and
   a first connection electrode connected to the common voltage line,
   wherein the common electrode is connected to the first connection electrode through a first connection contact hole.

5. The fingerprint sensor of claim 4, further comprising a planarization layer covering side surfaces of the semiconductor layer, wherein the common electrode is disposed on the planarization layer, and the first connection contact hole penetrates the planarization layer.

6. The fingerprint sensor of claim 4, comprising:
   a gate electrode disposed on the substrate;
   a gate insulating layer disposed on the gate electrode;
   an active layer disposed on the gate insulating layer;
   a first insulating layer disposed on the active layer;
   a source electrode disposed on the first insulating layer and connected to the active layer through a source contact hole penetrating the first insulating layer; and a drain electrode disposed on the first insulating layer and connected to the active layer through a drain contact hole penetrating the first insulating layer.

7. The fingerprint sensor of claim 6, comprising:
second fingerprint pads disposed on the side of the substrate and spaced apart from the first fingerprint pad;
a sensing line connected to the source electrode;
a fingerprint scan line connected to the gate electrode; and
a fan-out line connecting at least one of the second fingerprint pads to the sensing line or the fingerprint scan line.

8. The fingerprint sensor of claim 4, further comprising:
a third fingerprint pad disposed on the side of the substrate and spaced apart from the first fingerprint pad;
a ground line connected to the third fingerprint pad; and
a second connection electrode connected to the ground line,
wherein the light-blocking conductive layer is connected to the second connection electrode through a second connection contact hole.

9. The fingerprint sensor of claim 8, further comprising:
a planarization layer covering side surfaces of the semiconductor layer; and
a second insulating layer disposed on the planarization layer,
wherein the light-blocking conductive layer is disposed on the second insulating layer, and the second connection contact hole penetrates the second insulating layer and the planarization layer.

10. The fingerprint sensor of claim 1, wherein the light guide unit comprises a lens array comprising a plurality of lenses.

11. The fingerprint sensor of claim 10, wherein a boundary between adjacent lenses of the plurality of lenses overlaps the light-blocking conductive layer.

12. The fingerprint sensor of claim 1, wherein the light guide unit comprises a light transmitting area and a light blocking portion.

13. The fingerprint sensor of claim 12, wherein at least one of the light transmitting holes overlaps the light transmitting area.

14. The fingerprint sensor of claim 1, wherein the light guide unit comprises a light blocking layer comprising pinholes.

15. The fingerprint sensor of claim 14, wherein at least one of the light transmitting holes overlaps at least one of the pinholes.

16. The fingerprint sensor of claim 13, wherein a size of at least one pinhole is smaller than a size of at least one light transmitting hole.

17. A display device, comprising:
a display panel which displays an image; and
a fingerprint sensor which is disposed on a surface of the display panel and senses light passing through the display panel,
wherein the fingerprint sensor comprises:
a substrate;
a light sensing element that includes a sensing electrode disposed on the substrate and a common electrode disposed on the sensing electrode;
a light-blocking conductive layer that includes light transmitting holes and is disposed on the common electrode;
a light guide portion that guides light to the light sensing element and is disposed on the light-blocking conductive layer;
a fingerprint pad disposed on a side of the substrate;
aground line connected to the fingerprint pad; and
a connection electrode connected to the ground line,
wherein the light-blocking conductive layer is connected to the connection electrode through a connection contact hole.

18. The display device of claim 17, further comprising:
a bracket disposed on the surface of the display panel and including a battery hole; and
a battery disposed in the battery hole.

19. The display device of claim 17, wherein the fingerprint sensor overlaps the battery.

20. A fingerprint sensor, comprising:
a substrate;
a light sensing element that includes a sensing electrode disposed on the substrate and a common electrode disposed on the sensing electrode;
a light-blocking conductive layer that includes light transmitting holes and is disposed on the common electrode;
a light guide portion that guides light and is disposed on the light-blocking conductive layer;
a fingerprint pad disposed on a side of the substrate;
aground line connected to the fingerprint pad; and
a connection electrode connected to the ground line,
wherein the light-blocking conductive layer is connected to the connection electrode through a connection contact hole, and
wherein the light guided by the light guide portion is incident on the light sensing element through at least one of the light transmitting holes.

21. A fingerprint sensor, comprising:
a substrate;
a sensing electrode disposed on the substrate and connected to a transistor;
a common electrode disposed on the sensing electrode;
a light-blocking conductive layer disposed on the common electrode; and
a light guiding unit disposed on the light-blocking conductive layer;
the fingerprint sensor further comprising an insulation layer disposed between the common electrode and the light-blocking conductive layer,
wherein the light-blocking conductive layer is electrically insulated from the common electrode.

* * * * *